(12) United States Patent
Sri-Jayantha et al.

(10) Patent No.: US 7,748,895 B2
(45) Date of Patent: Jul. 6, 2010

(54) METHOD AND SYSTEM FOR REAL-TIME ESTIMATION AND PREDICTION OF THE THERMAL STATE OF A MICROPROCESSOR UNIT

(75) Inventors: Sri M. Sri-Jayantha, Ossining, NY (US); Hien P. Dang, Nanuet, NY (US); Arun Sharma, New Rochelle, NY (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 11/930,633

(22) Filed: Oct. 31, 2007

(65) Prior Publication Data

US 2008/0059111 A1    Mar. 6, 2008

Related U.S. Application Data

(62) Division of application No. 10/892,211, filed on Jul. 16, 2004, now Pat. No. 7,347,621.

(51) Int. Cl.
*G01K 1/00* (2006.01)
*G01K 3/00* (2006.01)
*G01K 13/00* (2006.01)

(52) U.S. Cl. .................. 374/134; 374/137; 374/141
(58) Field of Classification Search .................. 374/134, 374/137, 141; 702/130
See application file for complete search history.

(56) References Cited

U.S. PATENT DOCUMENTS

| | | |
|---|---|---|
| 5,557,551 A | 9/1996 | Craft |
| 5,829,879 A | 11/1998 | Sanchez et al. |
| 5,902,044 A | 5/1999 | Pricer et al. |
| 5,915,232 A | 6/1999 | McMinn |
| 6,006,168 A | 12/1999 | Schumann et al. |
| 6,098,030 A | 8/2000 | McMinn |
| 6,198,245 B1 | 3/2001 | Du et al. |
| 6,349,269 B1 | 2/2002 | Wallace, Jr. |
| 6,397,321 B1 | 5/2002 | Yamamoto et al. |
| 6,438,503 B1 | 8/2002 | Chiang |
| 6,438,504 B2 | 8/2002 | Mikubo et al. |
| 6,484,117 B1 | 11/2002 | Wohlfarth |
| 6,786,639 B2 | 9/2004 | Covi et al. |
| 7,039,888 B2 | 5/2006 | Steinmann et al. |
| 7,144,152 B2 | 12/2006 | Rusu et al. |
| 7,313,709 B2 | 12/2007 | Dang et al. |
| 7,587,559 B2 * | 9/2009 | Brittain et al. ............... 711/154 |

(Continued)

FOREIGN PATENT DOCUMENTS

EP    0 785 498 A2    7/1997

(Continued)

OTHER PUBLICATIONS

European Search Report dated Feb. 10, 2009.

(Continued)

*Primary Examiner*—Gail Verbitsky
*Assistant Examiner*—Mirellys Jagan
(74) *Attorney, Agent, or Firm*—McGinn IP Law Group PLLC; Vazken Alexanian

(57) ABSTRACT

A method (and system) of predicting a thermal state of a transient thermal system, includes combining sensor outputs and thermal parameters to construct a consistent set of estimates of internal temperature of a transient thermal system.

10 Claims, 21 Drawing Sheets

U.S. PATENT DOCUMENTS

| | | | |
|---|---|---|---|
| 2002/0065049 A1 | 5/2002 | Chauvel et al. | |
| 2002/0169924 A1 | 11/2002 | Osborn | |
| 2003/0125900 A1 | 7/2003 | Orenstien et al. | |
| 2003/0152132 A1 | 8/2003 | Pipe et al. | |
| 2003/0229662 A1 | 12/2003 | Luick | |
| 2004/0044915 A1* | 3/2004 | Bose et al. | 713/320 |
| 2004/0128101 A1* | 7/2004 | Hermerding, II | 702/136 |
| 2004/0221185 A1* | 11/2004 | Bose et al. | 713/300 |
| 2005/0071701 A1 | 3/2005 | Luick | |
| 2005/0180488 A1 | 8/2005 | Rusu et al. | |
| 2005/0216221 A1 | 9/2005 | Broyles et al. | |
| 2005/0216222 A1 | 9/2005 | Inoue | |
| 2005/0278555 A1* | 12/2005 | Chaparro et al. | 713/300 |
| 2006/0031794 A1 | 2/2006 | Li et al. | |
| 2006/0080062 A1 | 4/2006 | Bose et al. | |
| 2006/0218428 A1* | 9/2006 | Hurd | 713/500 |
| 2007/0168151 A1 | 7/2007 | Kernahan et al. | |
| 2007/0198863 A1* | 8/2007 | Bose et al. | 713/300 |
| 2008/0043807 A1 | 2/2008 | Yazawa et al. | |
| 2008/0120514 A1* | 5/2008 | Ismail et al. | 713/324 |

OTHER PUBLICATIONS

David Brooks, et al., "Dynamic Thermal Management for High Management for High-Performance Microprocessors", IEEE, 2001, pp. 171-182.

Ting-Yuan Wang, et al., "3D Thermal ADI—An Efficient Chip-Level Transient Thermal Simulator", ISPD, Apr. 2003, pp. 10-17.

David Brooks, et al., "Wattch: A Framework for Architectural-Level Power Analysis and Optimizations" ISCA, 2000, pp. 83-94.

T. Goh, et al., "Thermal Methodology for Evaluating the Performance of Microelectronic Devices with Non-Uniform Power Dissipation," IEEE-Electronics Packaging Technology Conference, 2002, pp. 312-315.

C. Tsai, et al. "Substrate Thermal Model Reduction for Efficient Transient Electrothermal Simulation," IEEE, 2000, pp. 185-190.

International Search Report dated Dec. 13, 2005.

Anoop Iyer, et al., "Power Aware Microarchitecture Resource Scaling", Department of Electrical and Computer Engineering, Center for Electronic Design Automation, Carnegie Mellon University, pp. 190-196.

International Preliminary Report on Patentability (Chapter 1 of the Patent Cooporation Treaty) (PCT Rule 44bis.1(c)), May 18, 2007, International Application No. PCT/US2005/0338815, The International Bureau of WIPO.

* cited by examiner

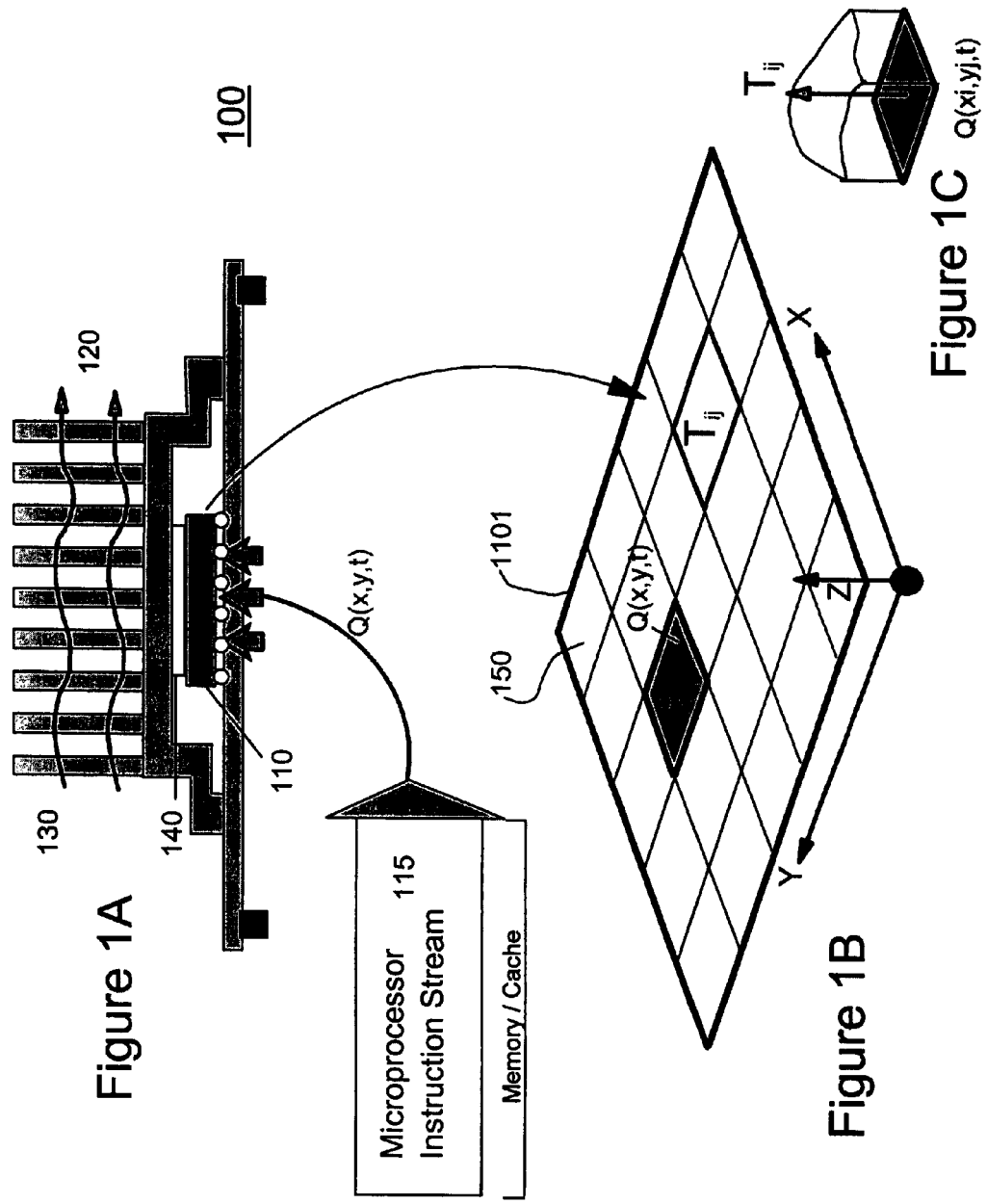

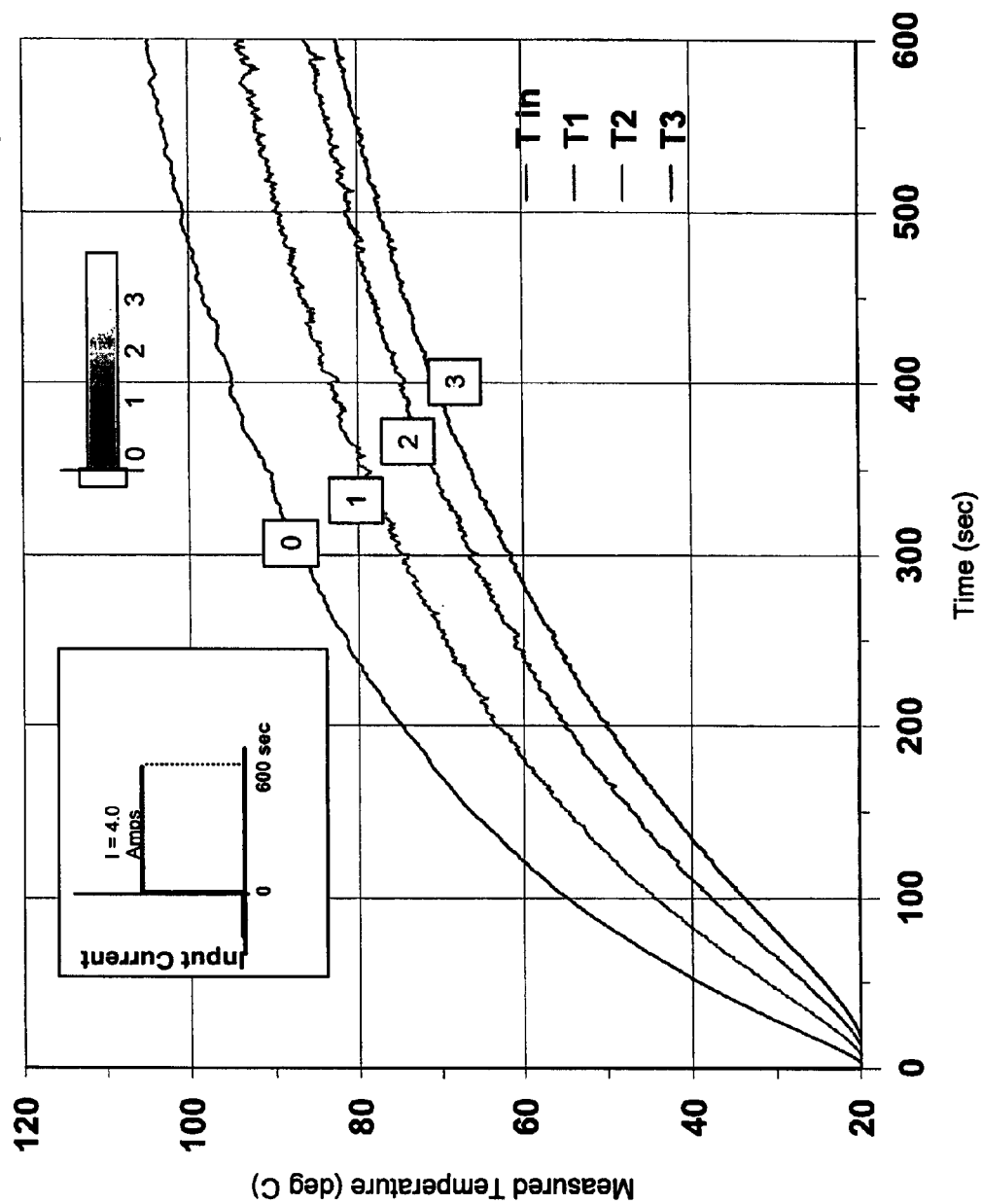

1400

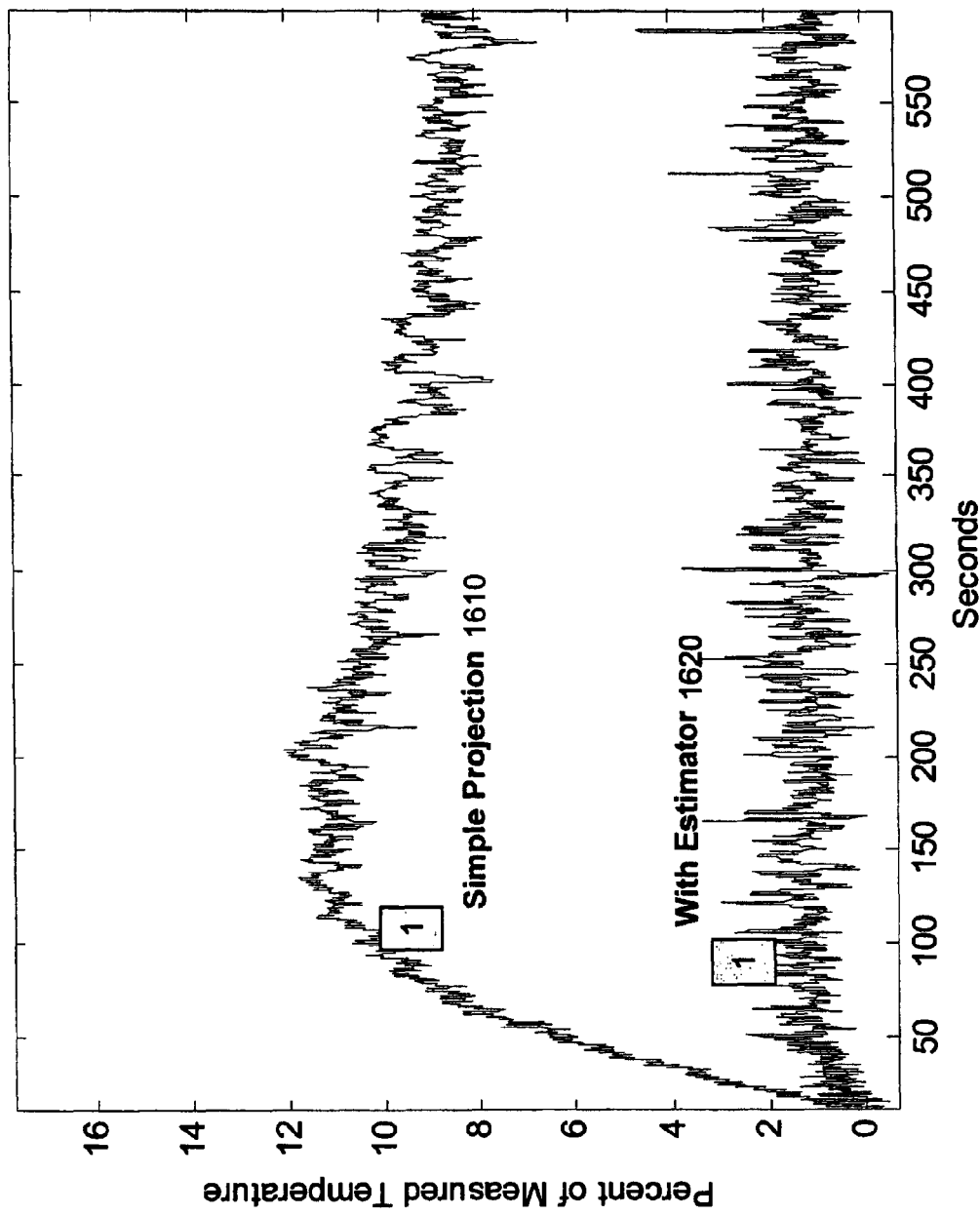

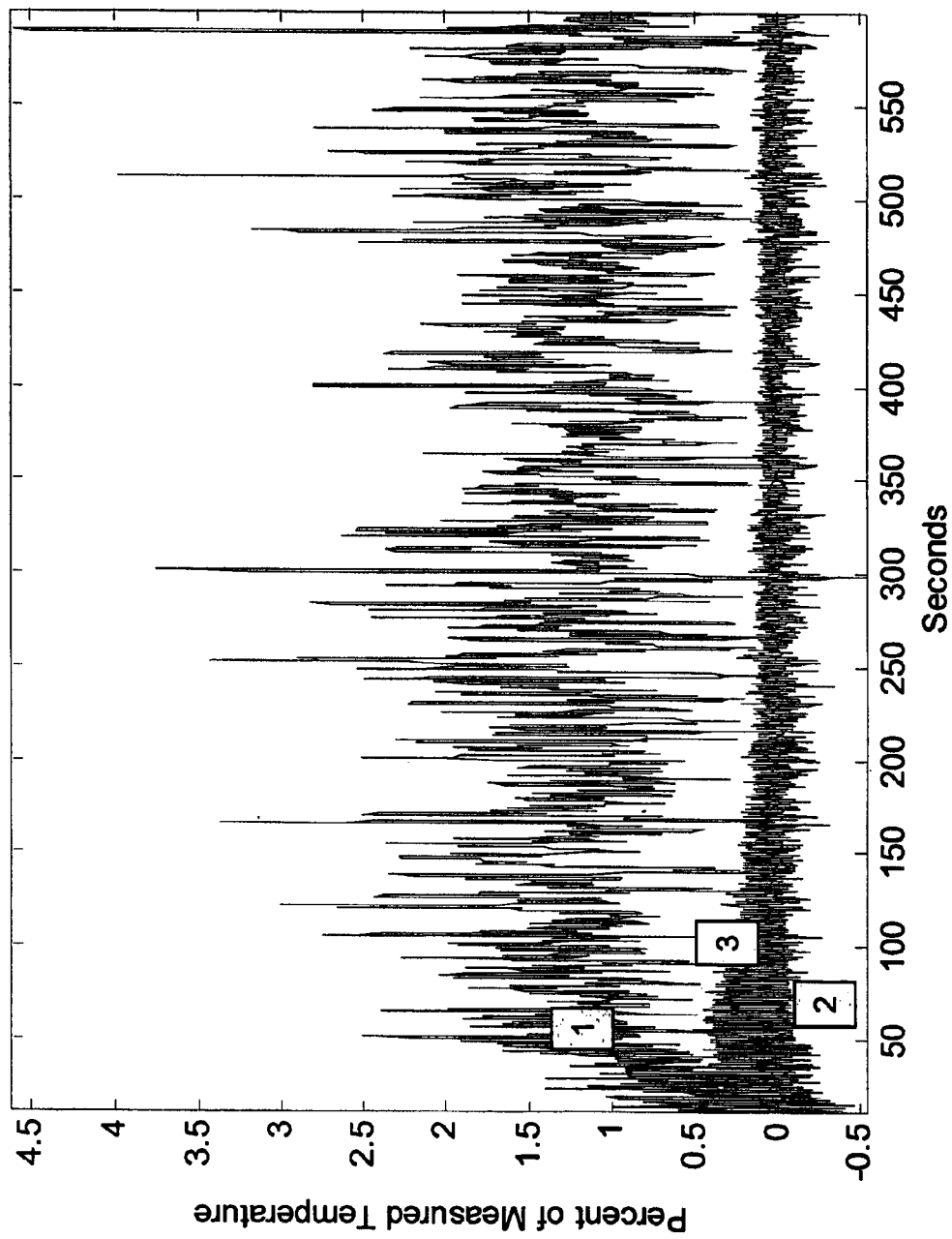

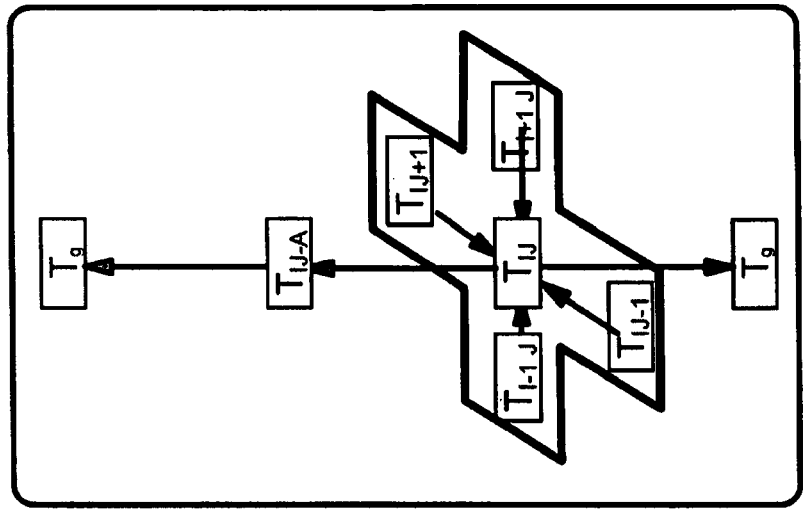
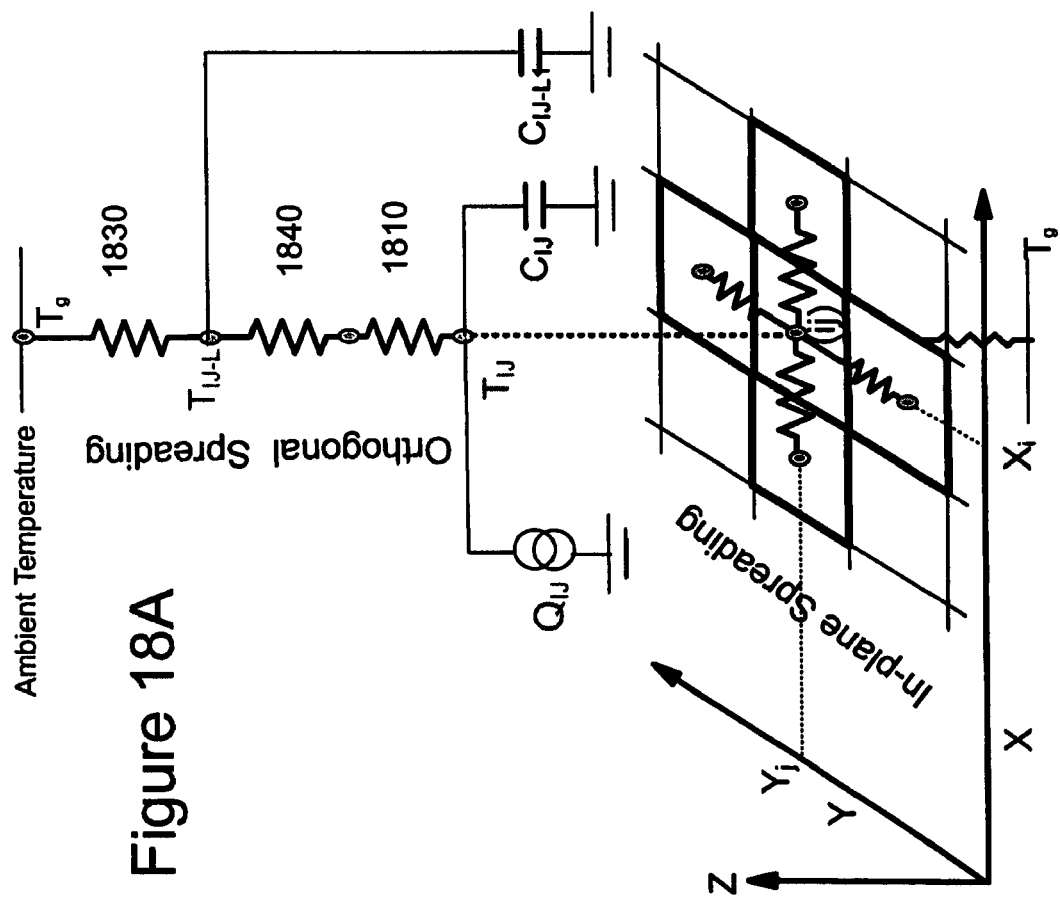
Figure 18A
Figure 18B
1800

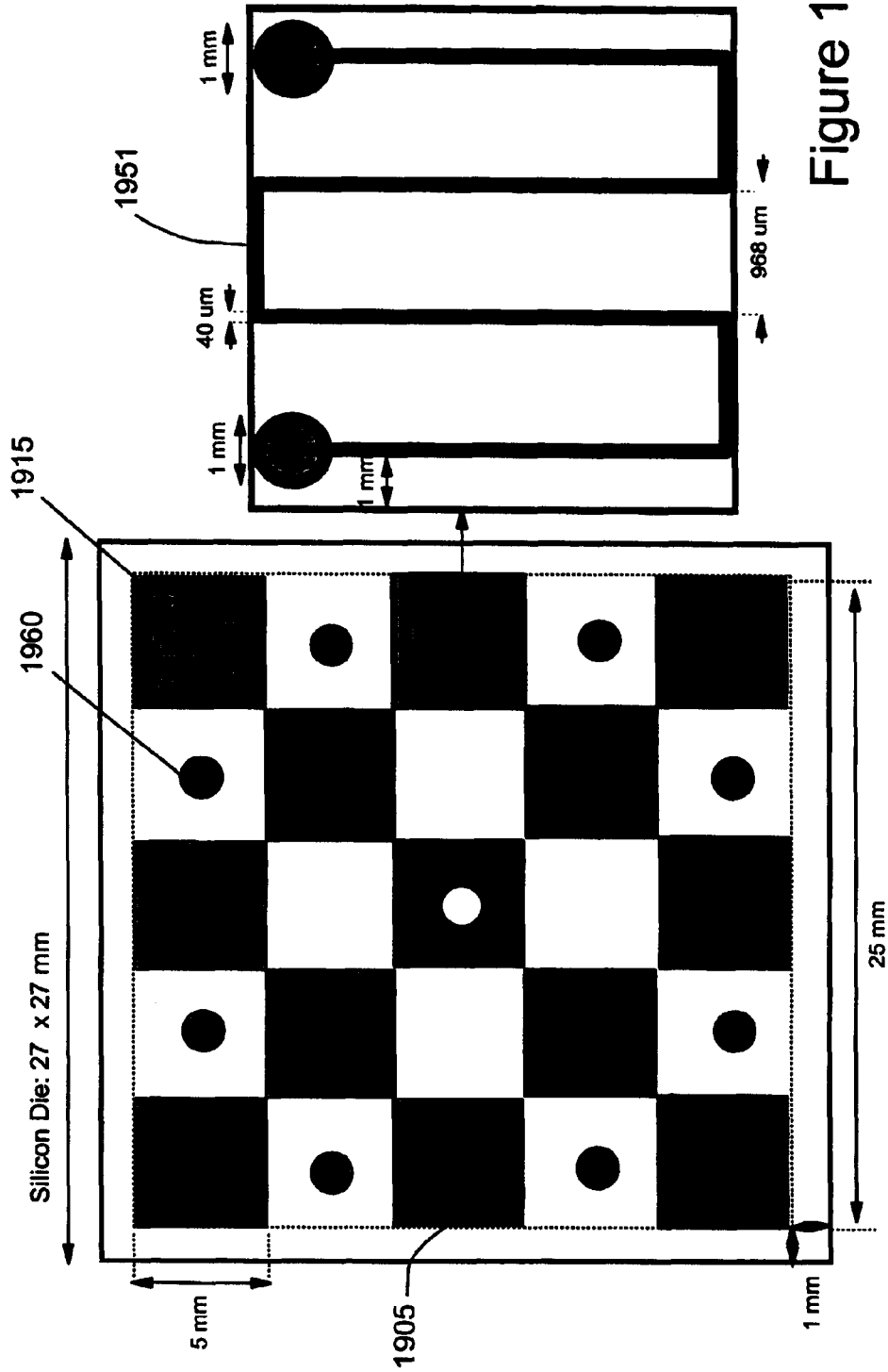

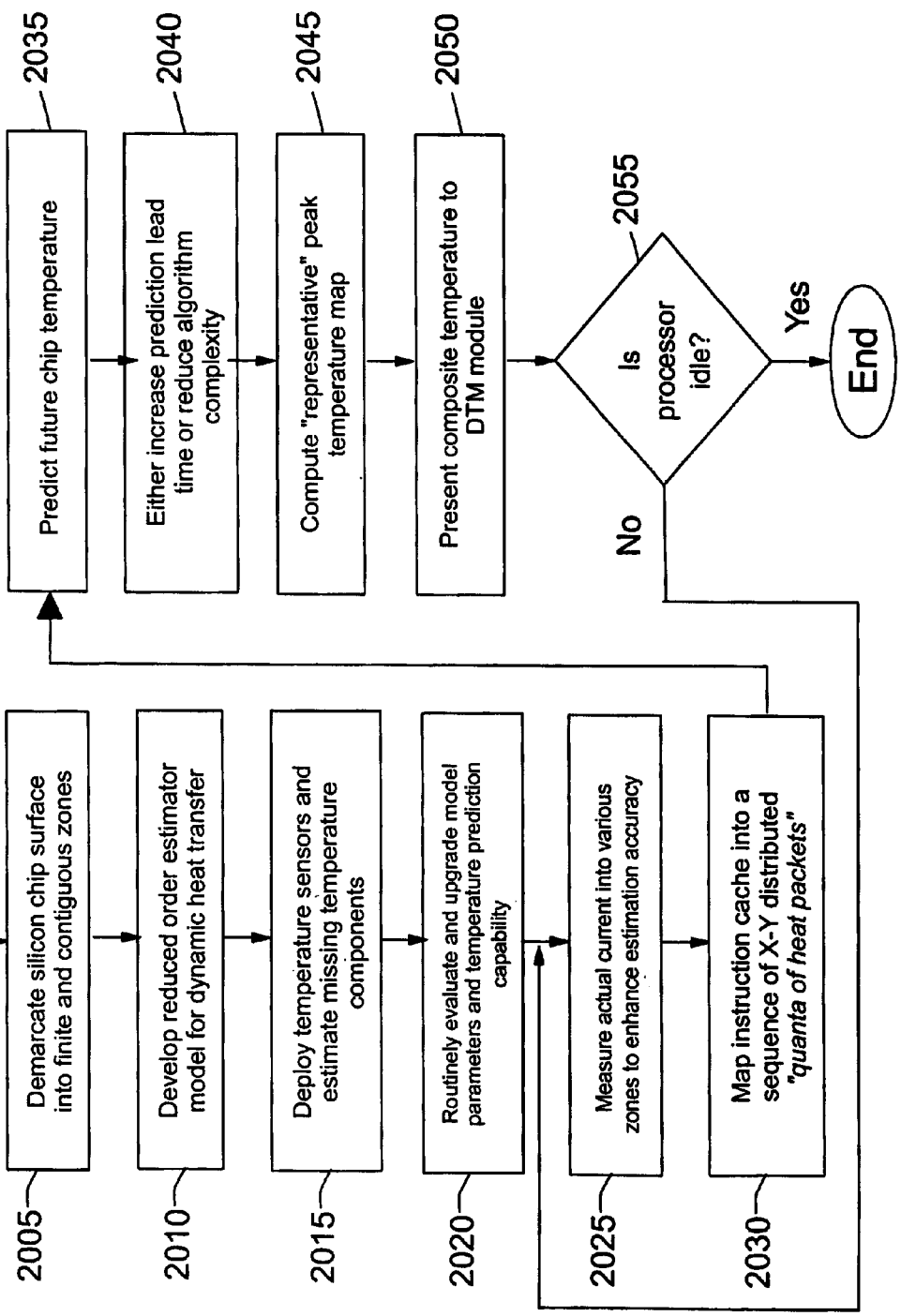

METHOD AND SYSTEM FOR REAL-TIME ESTIMATION AND PREDICTION OF THE THERMAL STATE OF A MICROPROCESSOR UNIT

RELATED APPLICATIONS

This Application is a Divisional Application of U.S. patent application Ser. No. 10/892,211, filed on Jul. 16, 2004 now U.S. Pat. No. 7,347,621, which is incorporated herein by reference.

BACKGROUND OF THE INVENTION

1. Field of the Invention

The present invention generally relates to a method and apparatus for estimation and prediction of a thermal state of an electronic device, and more particularly to a method and apparatus for real-time estimation and prediction of a thermal state (e.g., global temperature distribution) of a microprocessor unit with a limited set of temperature and current measurements.

2. Description of the Related Art

Present computer systems do not have the capability to extract the spatial distribution of temperature (e.g., thermal energy) while accounting for the thermal dynamics of the system.

Typically, one or two thermal sensors are used to trigger entry of a processor into a protection mode. As a result, the allowable temperature on the chip is conservatively held lower than necessary, in order to avoid breaching the junction temperature specifications. This is inefficient and can be problematic.

Additionally, sustained power dissipation over a zone can give rise to "hotspots" on the silicon that could reduce the integrity of a chip. Conservative temperature specification, however, limits the performance of a processor. Thus, there is a tradeoff between keeping the chip "safe" and to optimizing the performance of the chip.

Prior to the present invention, there have been no apparatus and techniques which have addressed extracting the local and global maximum temperature on a chip in real time, or that have facilitated the development of a structured method to manage the temperature on a chip.

Power consumption in a microprocessor (20 mm×20 mm silicon chip) is predicted to grow far beyond 100 Watts during this decade. FIG. 1A shows a typical cooling configuration where the execution of a stream of machine instructions determine the amount of power, Q(x,y,t), dissipated in the X-Y plane (e.g., see FIG. 1B).

The power has a steady (DC) component called "leakage current." Each clock cycle releases a "quanta of energy packet" distributed in the X-Y plane in the processor circuit layer, thus contributing to an unsteady AC component.

The cumulative effect of AC and DC power dissipation in a processor is a major limiting factor in realizing its full potential performance. The trend toward increased power dissipation is expected to pose an ever greater challenge to the processor and cooling system design. The transient power produces time varying temperature where Tij represents an average temperature for a selected zone (i,j) at any given time, as shown in FIG. 1C. Coordinates xi and yj correspond to the center of a rectangle (i,j). Strictly, Tij is actually Tij(t) for a continuous time system.

A computer system's cooling capability determines the average temperature of a processor system. However, the execution of instructions causes spatially non-uniform and time varying power dissipation, Q(x,y,t), in a processor where "t" denotes time. The corresponding temperature, T(x,y,t), can have local maximums and a global maximum at a given time instant.

A sorting algorithm, for example, may tax the arithmetic unit (AU) of a chip, whereas a solution to a complex fluid dynamic problem may tax the floating point unit (FPU). The resulting transient temperature, T(x,y,t), can fluctuate several degrees relative to the average bulk temperature of the cooling system. The time scale involved can be anywhere from a fraction of a millisecond to a few milliseconds. A processor has several logically separate units, such as the arithmetic unit, a floating point unit, a cache, an instruction decode unit, etc. It is noted that not all units are uniformly activated during a computational operation, and the location where maximum temperature occurs understandably shifts with time.

Theoretically, a large array of temperature sensors distributed over a silicon surface containing active circuit devices could provide a quantitative link to the present temperature of a chip in X-Y dimensions.

However, embedding a multitude of transistor(diode)-based temperature sensors within the digital electronic circuit not only interferes with the digital circuit design, but also impacts cost, performance and reliability of a processor system.

Indeed, one way to measure the temperature of the microprocessor is to use a diode as a temperature sensor. This diode could be external or built into the chip. External temperature diodes are fabricated on semiconductor processes optimized for analog circuits and tend to have better resolution than internal diodes. The current state of the art is +/−1 deg C. A built-in diode must compromise with a digital circuit and has much worse specifications.

For example, the Motorola PowerPC® has a temperature sensing diode with +/−4 deg. C. resolution. It is well known that the forward voltage drop across a diode, $V_d$, is linearly proportional to the temperature, given by the following equation:

$$V_d = (N*k*T/q)*\ln(I_f/I_s)$$

where N=non-linear factor, k=Boltzman's constant, T=absolute temperature, q=electron charge, $I_f$=forward current, $I_s$=saturated current. N and $I_s$ are process- and device-dependent. Thus, each diode must be calibrated before use. This is problematic and time-consuming.

However, there are several ways to bypass the calibration. One way is to make one diode much larger than the other one (32×) and look at the ratio of the two $V_d$ voltages as suggested by U.S. Pat. No. 5,829,879 to Sanchez, incorporated herein by reference. Another way is to vary the forward current, $I_f$, and also look at the ratio of the two voltages to determine the nonlinear factor. Both ways have substantial penalties: much larger chip area (case 1) or multiple current sources (case 2).

A temperature sensing diode gives out about 2 mV/deg C., requires stable current source(s), low-noise amplifiers and high-resolution ADC for proper operation. It would be a major challenge to integrate all of the analog components with noisy high-speed digital circuits to measure temperatures accurately at many different locations.

Another practical consideration is that often one cannot put the diode sensor directly on the hot-spot because of space constraints. Thus, even with the best sensor, some form of spatial extrapolation is still needed to determine the true hot-spot temperature.

Further, bandwidth-limited sensors can provide, at best, a delayed measure (due to its time constant) of the present temperature at a location, and have no ability to predict the temperature characteristics under a given computational load.

Additional propagation delay in the X-Y plane due to thermal capacitance makes the present temperature at an arbitrary location deviate from that of a nearby sensor.

If the present and future temperature of a microprocessor chip can be predicted a few milliseconds ahead using an intelligent methodology, in conjunction with a limited set of sensors (temperature, current, etc.), then new methods to manage processor temperature can be developed. Dynamic thermal management (DTM) techniques (e.g., see D. Brooks and M. Martonosi, "Dynamic Thermal management for High Performance Microprocessors," IEEE, 2001, 171-182) can be applied through an improved knowledge of the thermal state. Adaptive cooling systems can be configured to optimize the chip's performance.

Thus, "hot spots may move around on a chip depending upon the type of applications. Hence, the use of global ranges or discrete temperature sensors are not optimal. Further, a 2-3 degree conservative prediction may stifle performance. Additionally, there is a problem in placing the discrete sensors in the right spot. Indeed, many applications prevent sensors from being placed in the area of interest.

Yet another problem, prior to the present invention, has been that placing an alien (e.g., separate) temperature sensing circuit into an optimized digital unit (e.g., a processor, a floating point unit or the like optimized for generations to work at maximum speed) may impair the performance of the processor (e.g., especially specialized chips such as game chips).

Hence, one cannot always place sensors where one likes, and thus estimates of temperature may be required. By the same token, it would be useful to know the temperature inside the processor/floating point unit with good accuracy without having the luxury of placing a sensor in the middle of the processor/floating point unit.

Thus, prior to the invention, no such optimal techniques have developed nor have the problems of the conventional techniques and apparatus been recognized. That is, there has been no innovation in temperature management of a chip through real time executable estimation and prediction of the chip temperature.

SUMMARY OF THE INVENTION

In view of the foregoing and other exemplary problems, drawbacks, and disadvantages of the conventional methods and structures, an exemplary feature of the present invention is to provide a method and structure for extracting the local and global maximum temperature on a chip in real time.

Another feature of the invention is to provide a structured method and system for managing the temperature on a chip.

Yet another feature of the invention is to provide a method (and system) to estimate and predict the global temperature distribution map on an electronic chip surface in real time with a limited set of temperature and current measurements.

In a first aspect of the present invention, a method (and system) are provided to estimate and predict the global temperature distribution map on an electronic chip surface in real time with a limited set of temperature and current measurements.

The method provides a logical framework in which the thermal transient dynamics of a system with uncertain parameters and the output of strategically deployed sensors are combined in order to facilitate the computation (e.g., referring to either estimation or prediction) of the chips maximum temperature. The method corrects for spatial offset and time delay involved in measuring a temperature. Simplification of the method is further achieved by trading off flexibility and accuracy of the computed values of the temperature.

The inventive methodology (and system) provides a real-time executable algorithm which may include the following:

1). Demarcating the silicon chip surface into finite and contiguous zones (e.g., rectangular zones) in an X-Y plane;

2). Developing a reduced order estimator model for dynamic heat transfer from chip surface to ambient;

3a). Deploying temperature sensors, and estimating missing temperatures components;

3b). (Temperature sensors are gainfully deployed on or away from the processor surface);

3c). (Actual current into various zones is measured to enhance estimation accuracy);

4). Mapping the instruction cache into a sequence of X-Y distributed "quanta of heat packets";

5). Predicting future chip temperature assuming the execution of cache content in step 4;

6). Using power history, prediction lead time is either increased or algorithm complexity is reduced;

7). Computing a "representative" peak temperature map from average computed temperature;

8). Presenting a composite temperature to the DTM module;

9). Repeating steps 3c to 7 above in real time at a commensurate sampling rate; and 10). Routinely evaluating and upgrading model parameters and temperature prediction capability.

Then, the predicted temperature distribution over the X-Y plane is exploited to achieve improved management of the temperature on the silicon surface. Both simple dynamic thermal management (DTM) methods or real time feedback control can be considered for implementation.

Depending on the specifics of processor/cooling system, alternative methods are shown where a simpler projection algorithm, or an array of sensors with a unique interpolation scheme, is used to construct the temperature distribution.

Thus, the invention can estimate/predict power based on the instruction stream (e.g., cache instruction stream) and it can be estimated how much power will be input into the chip to process such instructions (e.g., a 1 Mb instruction stream causes a predetermined amount of current, etc.). This would allow a designer to probe the instruction stream a priori, and the temperature (current) to be "dumped" into the chip can be predicted before it occurs. This would allow "reshuffling" the instructions of the program if it is determined that there would be violation of some established power characteristics criteria, etc. Hence, for example, the computational sequence could be managed such that one set of instructions could be selectively executed in favor of another, thereby to redistribute the power needs by changing the order of executing the instructions or the like.

Additionally, in a different application, assuming that there is some fine-form temperature-control device on top of the chip, there is the ability to channel (e.g., move) the cooling capability to the chip area which needs it most (e.g., a "hot spot"). That is, the cooling could be moved to the "hot spot" based on the prediction made (e.g., based on the upcoming instruction(s) to be processed). Hence, even if the cooling capability is fixed, there is the ability to redistribute it (move it) around based on the prediction of the present invention and knowing the temperature map. As such, the invention provides a preemptive control.

Even though the method (and system) exemplarily discussed herein is tuned for an application in the thermal management of a microprocessor, it should be understood that any chemical process industry or manufacturing industry that depends on a critical temperature that is not directly measurable can take advantage of the inventive method.

Additionally, the present invention can detect a malfunctioning or defective temperature sensor in that the invention can compare the sensor's measured/projected value output with the expected output of the sensor. If there is a large difference between the measured/projected value from the expected value, then the invention can declare the sensor as malfunctioning and the sensor can be removed from the inventive algorithm.

Hence, if one sensor is "misbehaving", then it is bound to create incongruent outputs. Thus, looking at the error between expected and measured values, and if it is above some predetermined limit/threshold, then the sensor can be judged as defective/malfunctioning and rearrange the algorithm to work with a new set of sensors.

Thus, the invention can be advantageously used for temperature sensor failure detection.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIGS. 1A-1C illustrate a typical cooling system 100 with a microprocessor chip;

FIG. 5 illustrates a measured temperature due to a step input current.

FIG. 16A illustrates error between simple projection and estimator-based construction are compared;

FIG. 16B illustrates error in estimation of measured temperatures compared to the missing state;

FIGS. 18A-18B illustrate a lumped parameter model for a multidimensional thermal system;

FIG. 19 illustrates a two dimensional heat source for model validation; and

FIG. 20 is a flowchart of the inventive method 2000 which provides a real-time executable algorithm.

DETAILED DESCRIPTION OF EXEMPLARY EMBODIMENTS OF THE INVENTION

Figure 2B:
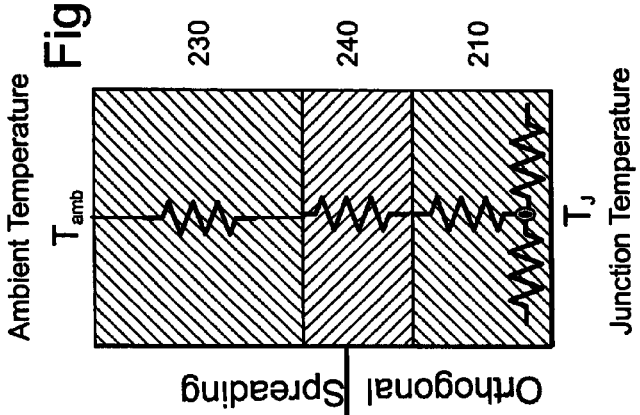
FIGS. 2A-2C illustrate a schematic representation of in-plane and orthogonal spreading of heat.

Referring now to the drawings, and more particularly to FIGS. 1A-20, there are shown exemplary embodiments of the method and structures according to the present invention.

Exemplary Embodiment

FIG. 1A shows a conventional cooling system 100 in which processor circuit 110 switching is driven by a sequence of an instruction set 115, and the heat flux 120 generated by the V(voltage)-I(current) product (due to a transistor switching operation) is eventually conducted to a heat sink 130 through a thermal interface material (TIM) 140. As shown and as understood, the heat flux will be spatially-distributed, unsteady heat flux.

The processor chip 110 itself is about 20 mm×20 mm in area with a thickness of about 500 um. FIG. 1B shows the bottom of a silicon surface 1101 of the chip 110 with active devices thereon. The heat generating surface 1101 is demarcated by a contiguous set of rectangles or squares 150 in the X-Y plane, as shown in FIG. 1B.

A lumped parameter model for a typical processor thermal system can be formulated (e.g., T. Goh, K. Seetharamau, G. Quadir, and Z. Zainal, "Thermal methodology for evaluating the performance of microelectronics devices with non-uniform power dissipation," IEEE—Electronics packaging technology conference, 2002, pp. 312-315).

Thus, the heat generating surface (e.g., the silicon surface) is looked upon as a planar device having a grid shape with zones (e.g., rectangular zones). Each rectangular zone, (i,j), is associated with an average temperature (Tij). It is understood that Tij is a proxy variable of the absolute maximum temperature for the zone (ij). A method to relate Tij to a representative Tij-max is discussed later. A challenge becomes whether the temperatures can be estimated and predicted in real-time.

Simple Interpolation Method:

Before turning to the estimation feature of the invention, a simpler method to track the maximum temperature on a chip is described.

By deploying an array of temperature sensors on the chip surface with (n×n) zones (e.g., see FIG. 1B), (n×n) instantaneous temperature values are measured. Since it is economical to distribute the sensors as far apart as possible, the measured data requires an interpolation scheme to determine the true local and global maximum.

On the other hand, the sensors must have a minimum separation so that a true maximum is not missed due to any spatial aliasing effect. Since the temperature distribution over a silicon surface with associated thermal capacitance cannot have abrupt discontinuity, it is reasonable to expect a smooth surface for the 2D temperature distribution.

Figure 2A:
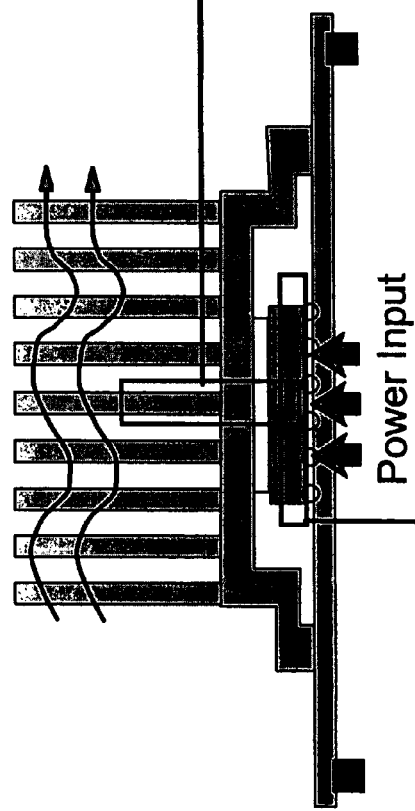
Figure 2C:
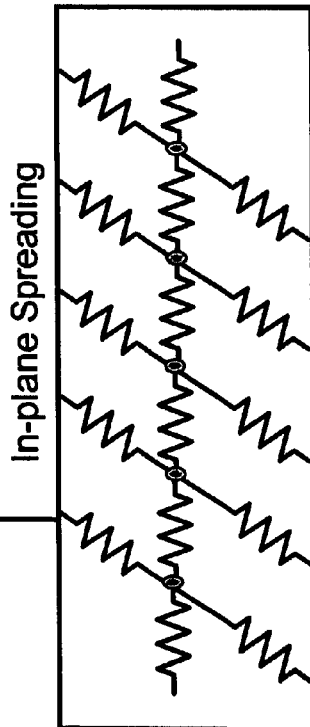

FIGS. 2A-2C show a schematic representation of discrete thermal model of the system, in which a heat flux path 220 is modeled in the form of a resistance network (e.g., see FIGS. 2B and 2C) in which there is orthogonal spreading (e.g., as shown in FIG. 2B) of the heat flux and in-plane spreading (as in FIG. 3) of the heat flux. Also noted are silicon microprocessor 210, heat sink 230, and thermal interface material (TIM) (thermally conductive paste) 240 similarly to that shown in FIGS. 1A-1C. It is noted that the heat flux 220 into a node of a zone, (ij), can occur only through neighboring zones.

Making the assumption that the temperature distribution between node (ij) and the surrounding four (4) nodes is a higher order function of (x, y), a Lagrangian interpolation method can be used to determine a plausible maximum temperature. It is noted that participation of five (5) nodes will yield a 10th order polynomial in x and y. Numerical simplification including the knowledge of the thermal characteristics of a typical processor system, can be made, and this can be a subject of a later invention and application.

By repeating the interpolation and maximum-value computation with respect to every node, a global maximum value is obtained for each measurement set at a given time instant. If the computational operation is repeated following each sampling time, then a real-time temperature map including maximum value can be obtained. Since the effects of thermal capacitance and resistance are not explicitly taken into account, the confidence in the simple temperature interpolation method is degraded. The present application seeks to further enhance the confidence level in the computation of maximum temperature.

Thus, a first exemplary feature of the present invention is to establish a simple dynamic model to estimate the temperature, Tij, of a rectangle (or square) centered at coordinate (xi, yj).

A next feature is to project the future temperature using an estimator-predictor along with the anticipated current (or heat dissipation). (The mechanism to extract the future current wave form in itself is a separate invention. Logically, by analyzing the instruction queue about to be executed, one can construct a current profile.).

A third feature of the invention is to translate the estimated temperature for a zone into a most likely peak temperature through a transformation operation. Each of these stages is discussed in detail hereinbelow.

Building a Model:

A processor chip with its associated cooling system can be mathematically viewed as a discrete set of thermal-resistance and thermal-capacitance distributed and coupled in a vast three dimensional space (e.g., T. Wang, Y. Lee, and C. Chen, "3D Thermal-ADI—An efficient chip-level transient thermal simulator," ISPD, April 2003, pp. 10-17)

Elaborate simulation packages to evaluate a processor design from a thermal viewpoint exist in the market today (e.g., D. Brooks, V. Tiwari and M. Martonosi, "Wattch: A framework for architectural-level power analysis and optimizations," ISCA, 2000, pp. 83-94).

A state variable representation of a thermal system corresponds to the nominal temperature of a discrete thermal capacitance, and a driving input is the current into a heat dissipating element. (A complete finite element representation of a processor system could result in a model with high order, for example 2500 or more, thus making it impossible for real time implementation.)

The model order for electrothermal simulation of chips can be mathematically reduced (e.g., see C. Tsai and S. Kang, Substrate thermal model reduction for efficient transient electrothermal simulation," IEEE, 2000, pp. 185-190).

In the present invention, using principles of heat transfer in a processor system and engineering assessment, the model complexity is reduced to a lower order system (e.g., in the range of 10 to 50).

A key to achieving a lower order model of the system is to view the spreading of heat flux into orthogonal (Z) and in-plane (XY) components as shown in FIGS. 2A-2C (for clarity, the thermal capacitance is not shown in FIGS. 2A-2C). Again, FIG. 2B shows the orthogonal spreading along the junction temperatures $T_J$ and the ambient temperatures $T_{amb}$. FIG. 2C shows the inplane spreading.

The in-plane surface is divided into a finite number of zones (e.g., 5×5). The orthogonal path is a single column including (composed of) a finite set of thermal capacitance and resistance corresponding to each XY-zone.

A state variable model of the thermal system can be driven by current input, and the model output can be organized to provide the corresponding temperature values. Typically, if the model is an exact representation of the real thermal system, then it should be able to compute the temperature distribution without any direct temperature measurements.

However, in practical "real world" applications, the models are only an approximation of a complex phenomena in which the thermal parameters are subject to changes. Therefore, to make the temperature prediction a robust (i.e., dependable and accurate) process, a certain amount of temperature measurement is needed.

Figure 3:
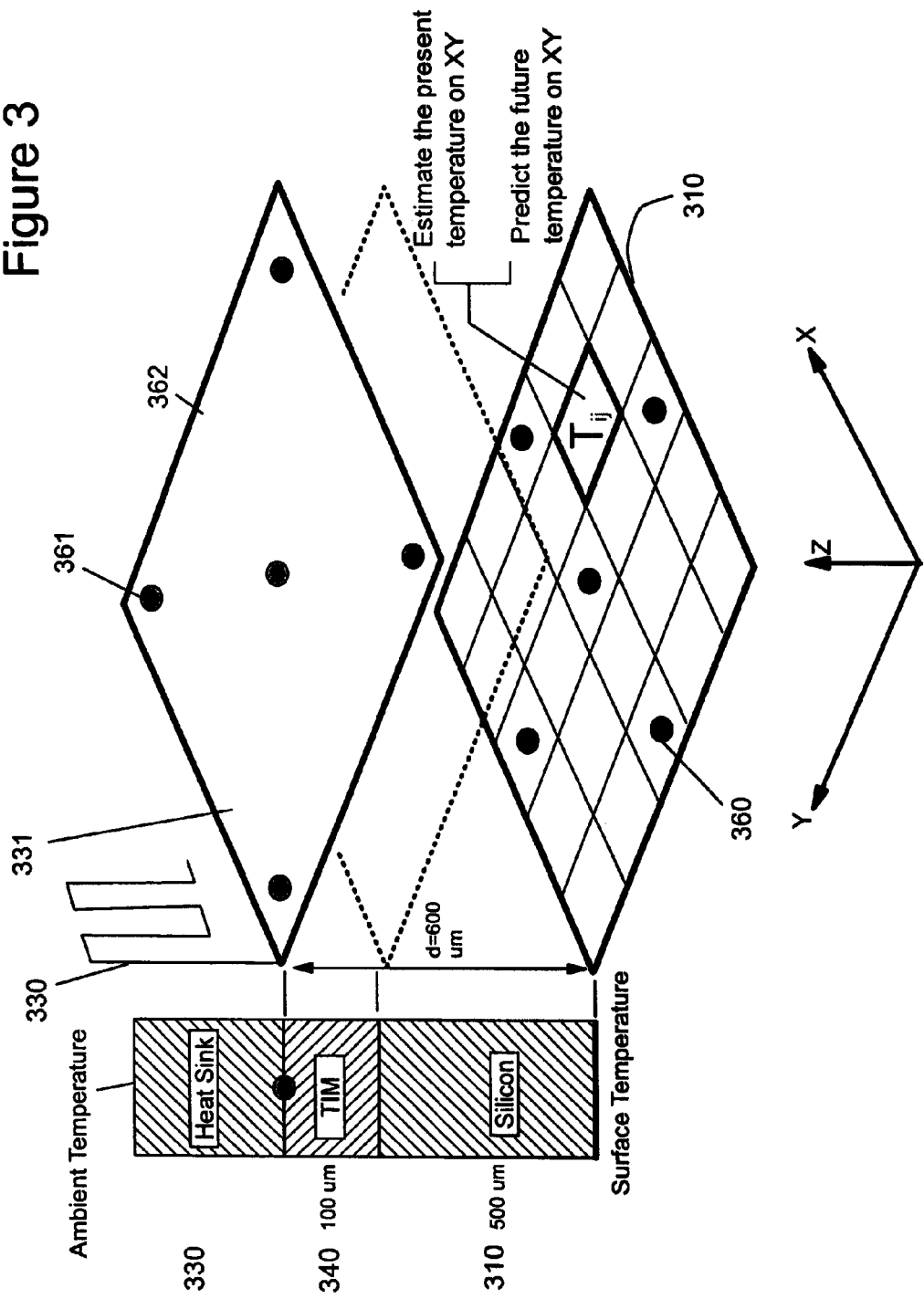
FIG. 3 illustrates estimating and predicting temperature from a distributed sensor system.

FIG. 3 shows a configuration in which a very limited amount of temperature measurement is assumed to be possible on the chip itself (e.g., through sensors 360 (e.g., directly distributed and optionally embedded on the silicon, with or without noise).

However, a significantly large amount (e.g., 10 to 20) of sensors 361 (with or without noise) can be distributed on the cooling system, such as the heat sink 330 (e.g., the smooth surface of the heat sink). Reference numeral 331 illustrates the TIM side of the heat sink 330. These sensors are advantageous since they do not affect the processor design.

However, a challenge is that these sensors 361 are bound to be separated from the chip surface by a distance (e.g., about 600 μm in some applications), and may not be able to provide the instantaneous peak-temperatures seen by the silicon surface 310. Thus, the measurement plane 362 is in the vicinity of the processor but is located away from the processor.

However, with the invention, by coupling a lower-order state variable model of the thermal system to the measurements of the distributed sensors 361, a logical procedure is developed to construct the missing temperature profile on the silicon surface 310 in real time.

The inventive method is shown to have accuracy in the presence of parameter variation. In general, the following limitations can be addressed by the same methodology:

Presence of sensor measurement noise;

Effect of finite sensor bandwidth;

Variation in thermal parameters; and/or

Augmented models for unknown current in X-Y zones.

Experimental Validation:

In order to validate the accuracy of the model, a series of experiments were conducted by the present inventors. The first is an experiment in which a one dimensional (1D) heat transfer problem is formulated.

Figure 4:
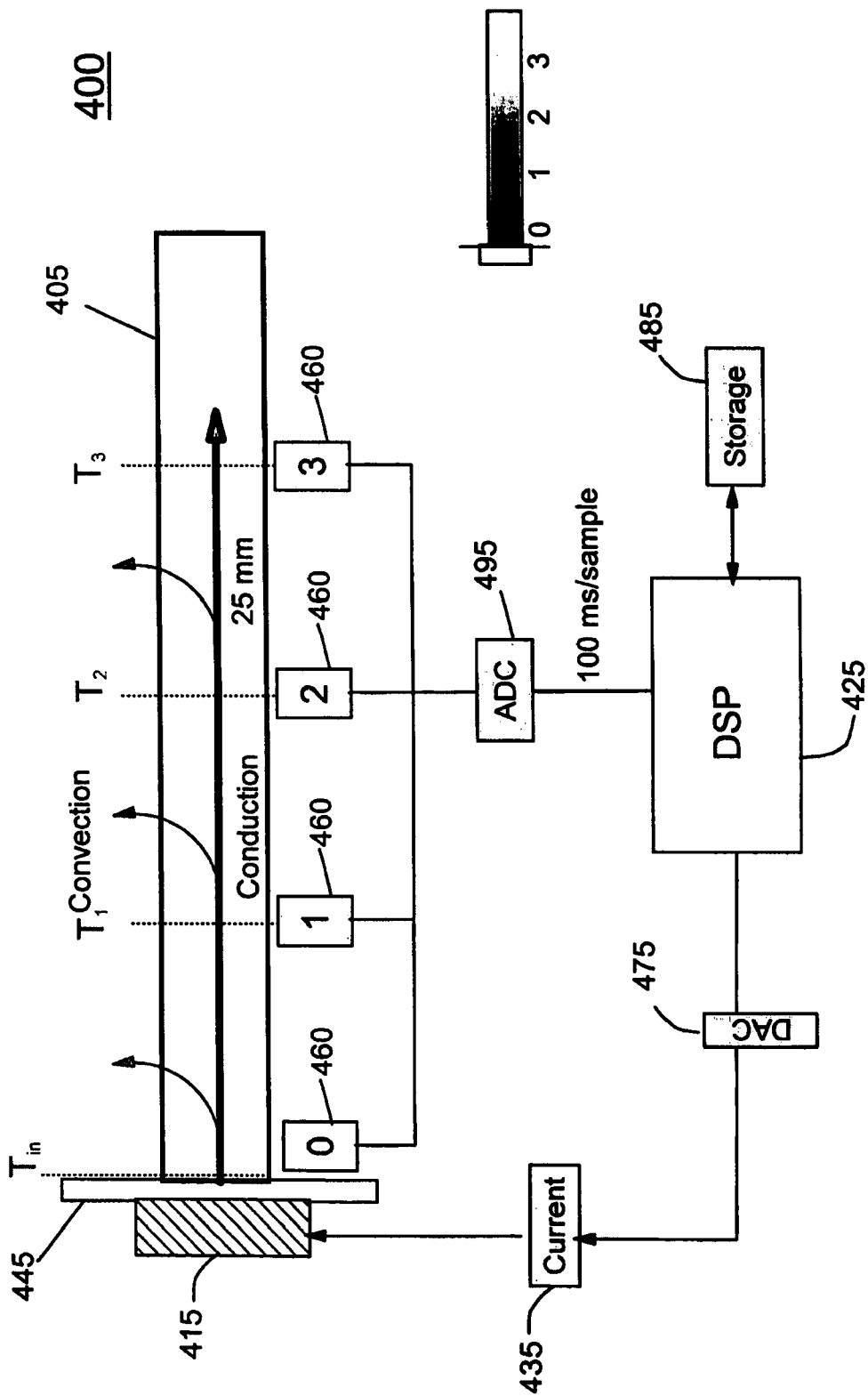
FIG. 4 illustrates one dimensional transient experiment 400 using a copper cylinder 405.

FIG. 4 shows a configuration 400 in which a solid copper cylinder 405 with an exemplary 12.5 mm diameter is driven by a heat source 415. The digital signal processor (DSP) 425 supplies a predetermined current wave form 435 into a set of power resistors (forming the heat source 415) attached to an exemplary 75 mm×75 mm square copper plate 445. The copper plate 445 functions as a uniform heat source. Also shown in FIG. 4 are a digital-to-analog converter 475, a storage 485, and a analog-to-digital converter 495.

The heat flux from the source 415 is conducted through the copper cylinder 405 in an axial direction. The heat flux is eventually transferred to the ambient through the natural convection of air surrounding the copper cylinder 405. Four temperature sensors (e.g., thermocouples) 460 are surface-mounted onto the copper cylinder 405, each exemplarily separated by about 25 mm.

The first temperature (Tin) is chosen as the driving input and the three remaining temperatures are modeled as the components of a state vector. Ideally, the drive input, Tin, should be replaced by current input to the heat source 415.

To illustrate a key feature of the methodology with reduced complexity, the problem as described has been modeled and further described with regard to FIGS. 5-6, which show a reduction to practice of the present invention.

FIG. 5 shows the transient temperatures measured for a step input current (e.g., see inset of FIG. 5) of 4 amps. An exponential rise in all temperature data can be observed as expected.

Near the time origin (t=0 or T0), there is a delay of 25 seconds in T3 compared to Tin. Tin represents T0 or the temperature which is driving the flux into the copper cylinder and three other temperatures are being monitored as T1, T2, and T3 (which are exponentially growing. Even though the sensors are at equal distance (25 mm), the temperature difference between adjacent sensors progressively decreases. This is due to heat flux being lost due to convection as it flows axially.

Hence, the issue is whether some of these temperatures (e.g., T1, T2, T3 etc.) can be projected knowing other temperatures, by using a model, and then measuring the temperatures and comparing the model and the measurements to determine how accurately these temperatures can be tracked in a simplified system.

Figures 6A, 6B, 6C:
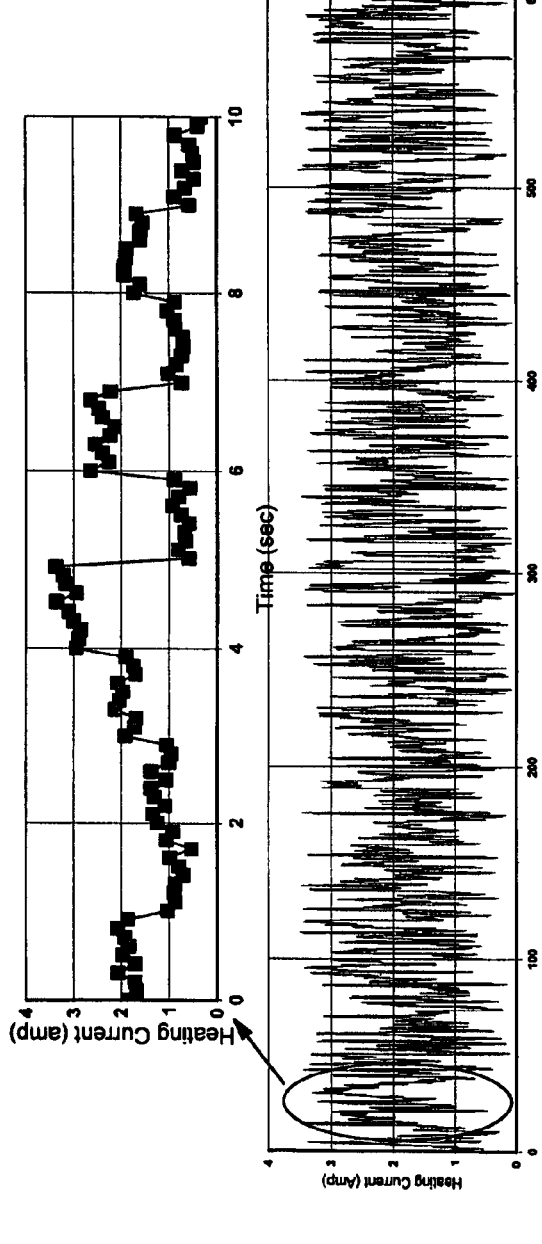
FIG. 6 illustrates a random heating of the copper cylinder 405.

FIGS. 6A-6C correspond to a random current waveform (AC) superposed on a DC current, and specifically the random heating of the copper cylinder. Thus, in contrast to FIG. 5 using only the step input current, FIG. 6 uses the random waveform on top of the step input, thereby to simulate execution of different programs (and thus different types of instructions) which generate different amounts of currents. FIG. 6B shows the details of FIG. 6A, and specifically the time sequence of current into the heater.

It can be observed from FIG. 6C (which shows the exponential rise of the actual temperatures due to average DC value) that the DC component causes the exponential rise in temperature, and that the random fluctuations in the current do not substantially impact the measured temperatures (e.g., Tin, T1, T2 and T3) significantly.

Also, the random component is progressively reduced as the measurement point is moved away from the heat source. Thus, the Tin waveform shows the greatest difference since it is the closest to the heat source and T3 shows the least since it is the furthest from the source.

In effect, the heat conducting material between the heat source 415 and the measurement point functions as a low pass filter. Therefore, the distance between the source 415 and the observation point is deemed to be critical to the estimation process.

Figure 7A:
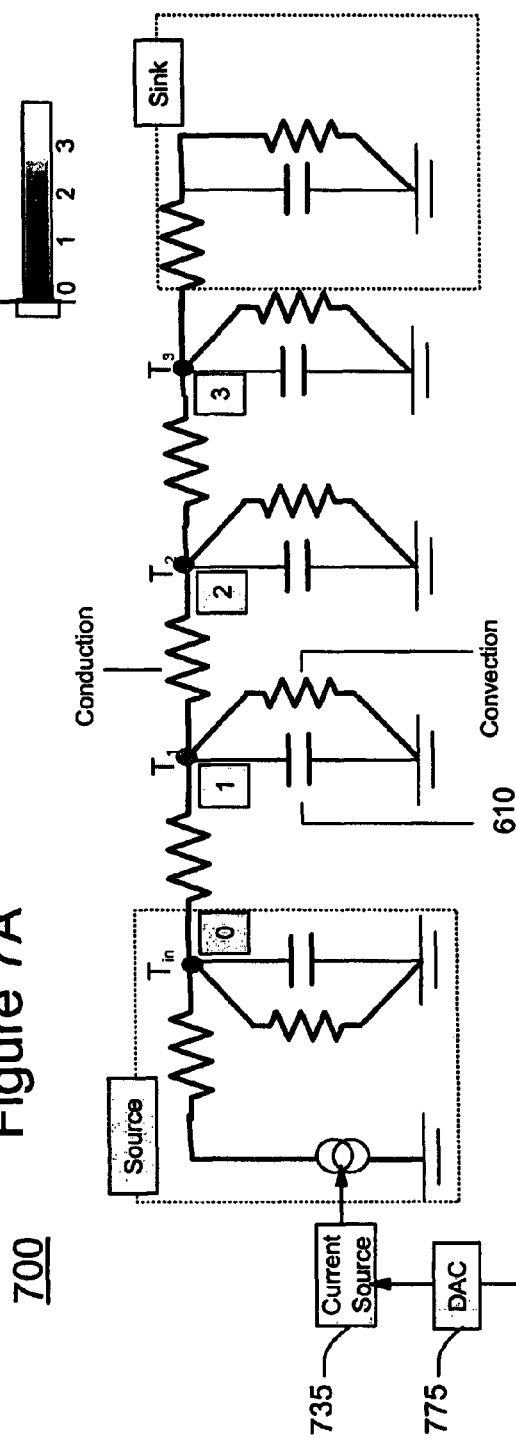
FIG. 7 illustrates a one-dimensional transient thermal model 700.
Figure 7B:
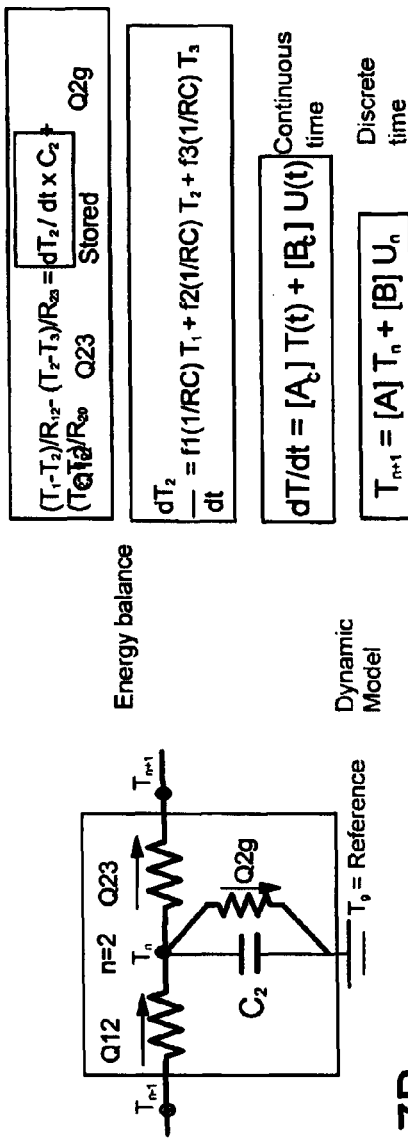

One-Dimensional Thermal Model:

FIG. 7A shows a lumped parameter model 700 (1D-transient thermal model) of the 1D thermal system corresponding to FIG. 4 and including a DSP 725, a current source 735, and a DAC 775. Reference numeral 610 represents thermal capacitance.

The electrical resistance corresponds to thermal resistance and capacitance corresponds to the thermal capacity 610 of the copper-cylinder sections. Each node, denoted by points 1, 2 and 3, must satisfy the energy balance. For example, node 2 of FIG. 2B must satisfy (subscripts are avoided for simplicity) Equations 1 and 2 below:

Energy inflow $Q12=(T1-T2)/R12$

Energy Out flow $Q23=(T2-T3)/(R23)$ (1)

Energy Outflow $Q2g=(T2-Tg)/R2g$

Energy stored$=C2 \times d(T2)/dt$

Energy balance: $Q12=Q23+Q2g+C2\ d(T2)/dt$ (2)

where subscript "g" refers to ground (in electrical systems parlance), and in thermal systems it is known as the ambient temperature, d( )/dt is the time derivative, R refers to thermal resistance between nodes and C is the thermal capacitance. It is noted that the thermal conductivity of copper and/or air film heat transfer coefficient (h) determines the resistance.

If T1, T2, and T3 are referred to as temperatures relative to the ambient, then eq. (2) can be rearranged as follows:

$C2 \times d(T2)/dt=(1/R12) \times T1+(-1/R12-1/R23-1/R2g) \times T2+(1/R23) \times T3$ (3)

When similar steps are repeated for each node, and grouped together in a matrix form where matrices are denoted by [ ], and column vectors are bold faced, the following dynamic model is obtained:

$dT/dt=[A_C] \times T+[B_C] \times U$ (4)

In equation 4, $[A_C]$ and $[B_C]$ are in general matrices associated with a continuous time representation of a thermal system, and [T] and [U] are column vectors of different length. In the example of FIG. 4, [U] is a one-dimensional variable. Using well-known discretization methods, equation (4) can be transformed to represent a thermal system that is observed only at discrete time instances. For a selected sampling rate, equation 4 becomes:

$Tn+1=[A] \times Tn+[B] \times Un$ (5)

where matrices [A] and [B] are well-known integral functions of $[A_C]$, $[B_C]$ and sampling time. The matrix [A], when applied to the selected example, is of the order of 3×3, and has a banded diagonal matrix, with 3 non-zero elements in row-2. To keep the model order low, the extended part of the cylinder is treated as resistance with no thermal capacity.

The measured temperature vector, denoted by Tm, is generally represented by:

$Tmn=[C] \times Tn+[D] \times Un$ (6)

For the example, with three elements of state variable representing T1, T2 and T3 and all three being directly measured, [C] is an identity matrix and [D] is a null matrix.

Figure 8:
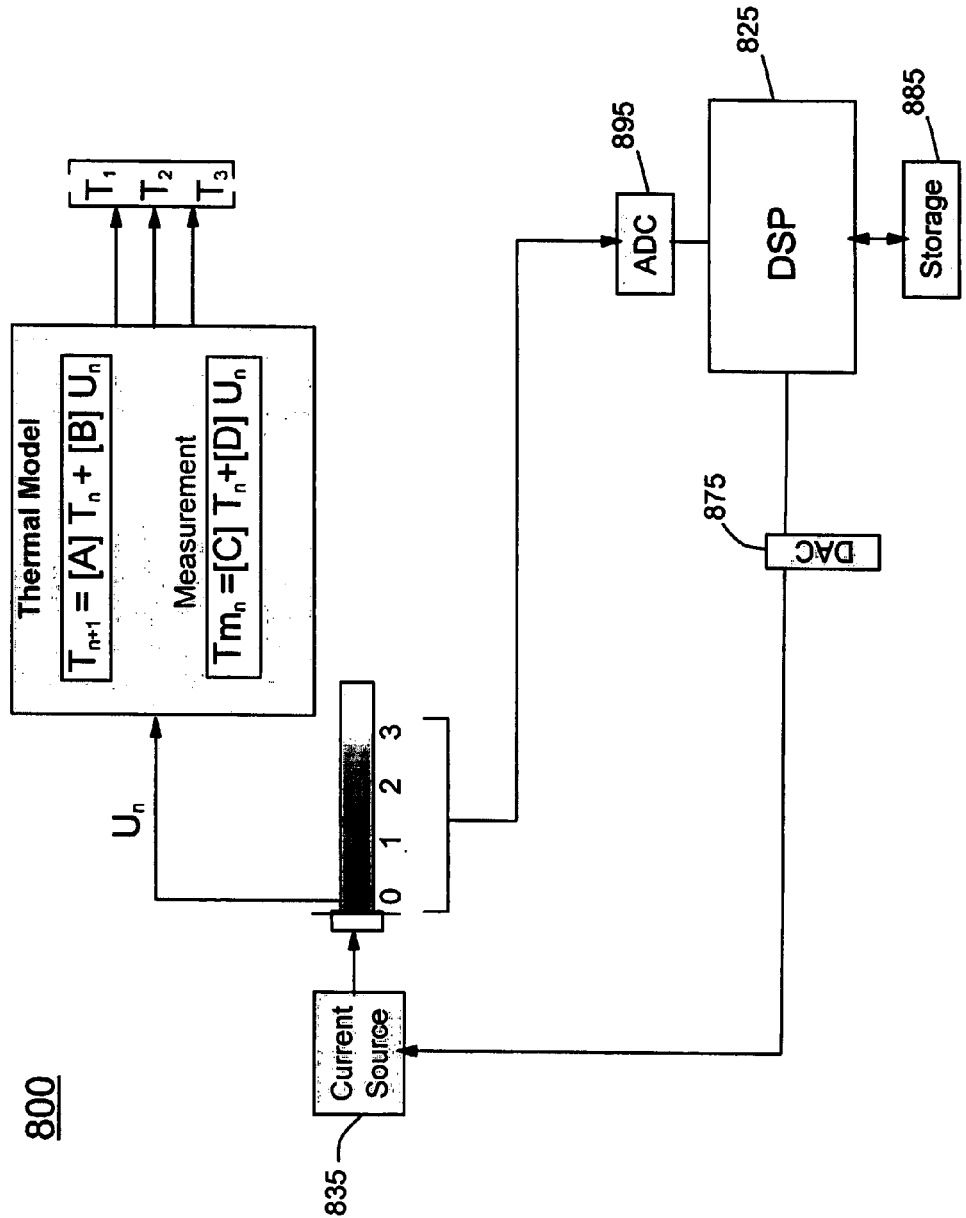
FIG. 8 illustrates a simple projection using a lumped parameter model 800.

FIG. 8 illustrates a model 800 of a simple projection using a lumped parameter including DSP 825, current source 835, DAC 875, storage 885, and ADC 895. The temperature is time-changing and Tn represents a current temperature at a given node/location and Tn+1 represents a temperature after a time has elapsed.

Observations show that this is a simple structure for computation and that the structure is sensitive to parameter variation. Thus, one way to project the expected temperatures (e.g., T1, T2, T3, etc.) in other locations is to measure temperatures at one location, build a thermal model, and using the model one can project the temperatures using the conductivity and thermal capacity and get the projected values.

Computing Temperature on a Chip with a Simple Extrapolation Method:

The model represented by Equation 5 can be applied to test its accuracy. For a step input in current, the temperature can be monitored.

Figure 9:
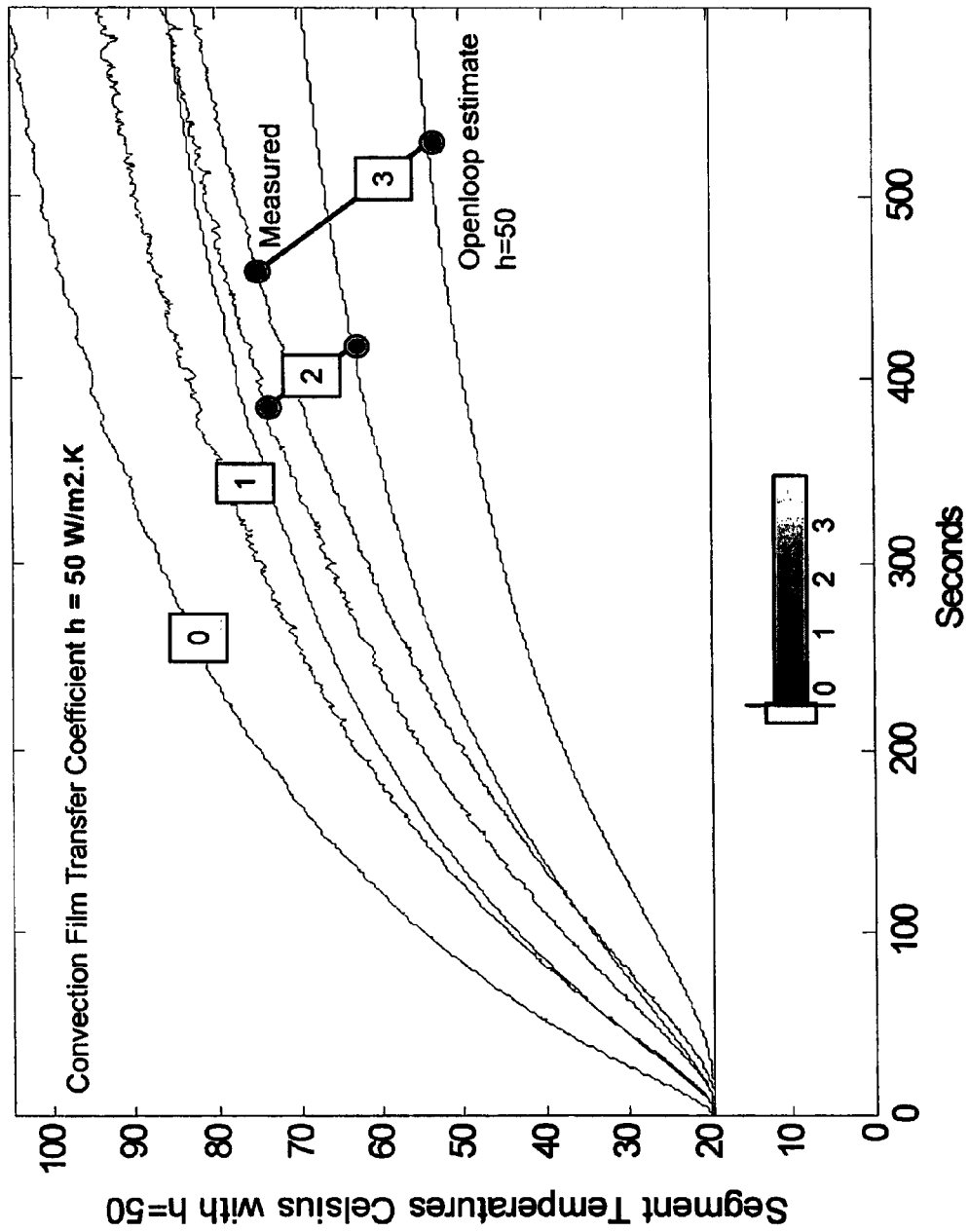
FIG. 9 illustrates an effect of parameter mismatch (e.g., film heat transfer error) on projection accuracy.

For an assumed film heat transfer coefficient h=50 W/m² s, FIG. 9 shows the time history of T1, T2 and T3 as projected by the model when Tin is used as the driving input. A large deviation from the measurement can be observed. Thus, FIG. 9 shows that if an assumption is made about the model parameters but such assumptions are not correct, then the model will not be able to project well and not know how much it is deviating from what the value should be.

For example, if the system were to be cooled by a fan, then forced convection would have the corresponding "h" value. However, if the fan was not ON, then natural convection takes place (which is the experimental case). If the h value for natural convection over a cylinder (=5.5) is chosen and all the elements are re-computed, then a highly improved projection can be obtained as shown in FIG. 10.

Figure 10:
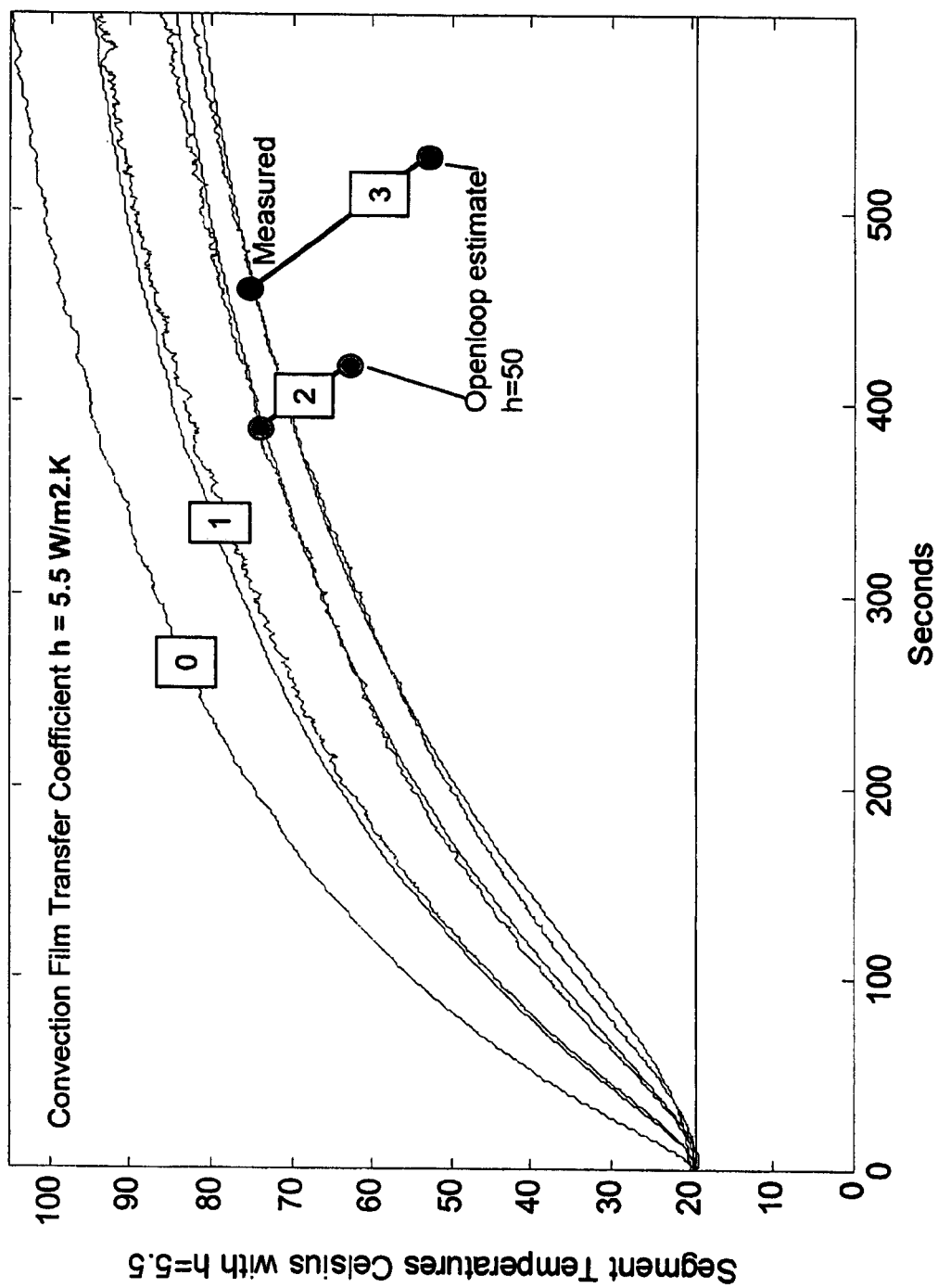
FIG. 10 illustrates improved model parameters that enhance projection accuracy.

Thus, FIG. 10 shows a simple model projection with no temperature information but with better parameters (e.g., again with h=5.5). Hence, if h=5.5 is put into the model, then the projected temperatures will track with minor deviation. Thus, a good projection can be made.

Figure 11:
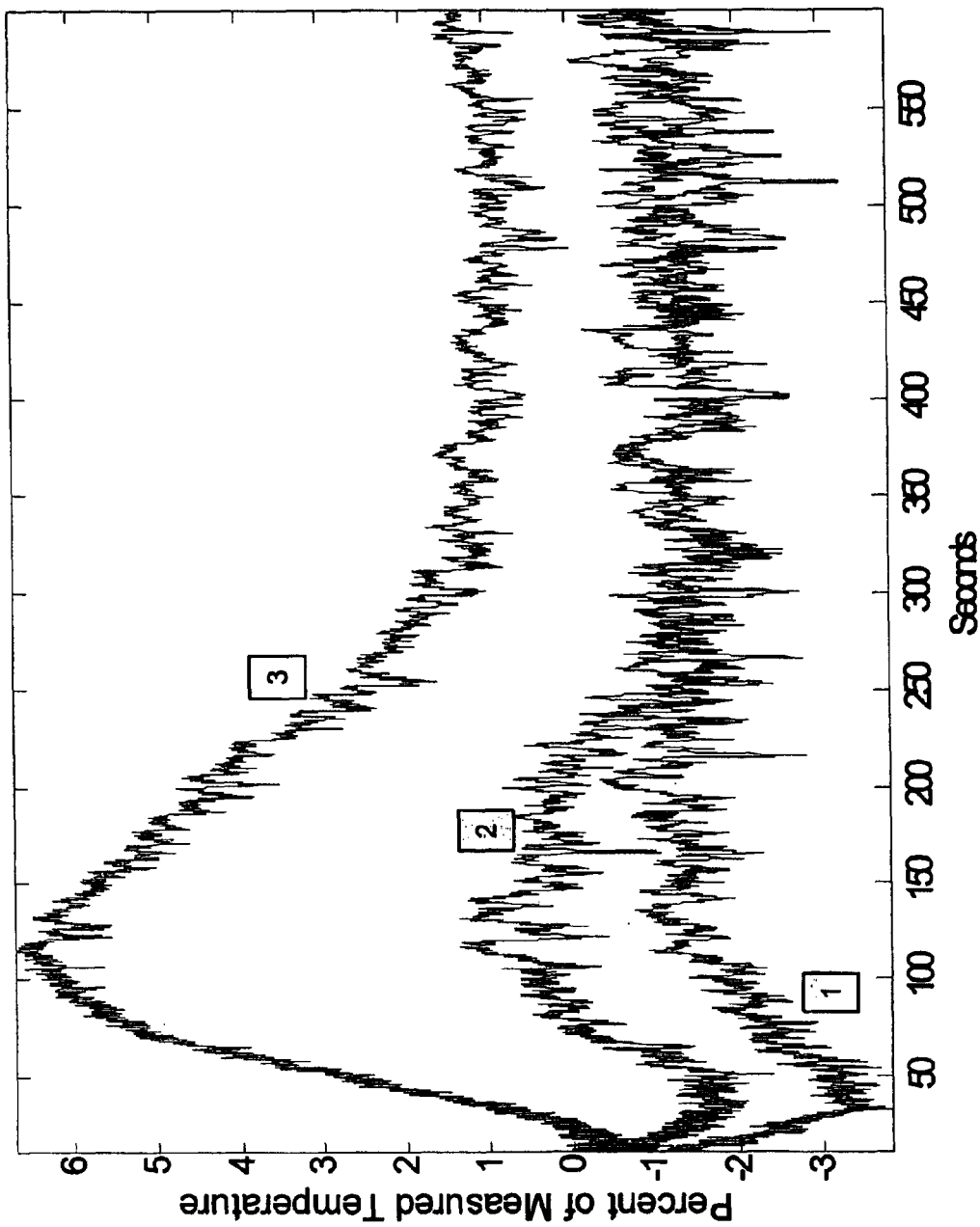
FIG. 11 illustrates relative error in projecting temperature due to error in film heat transfer coefficient.
Figure 12:
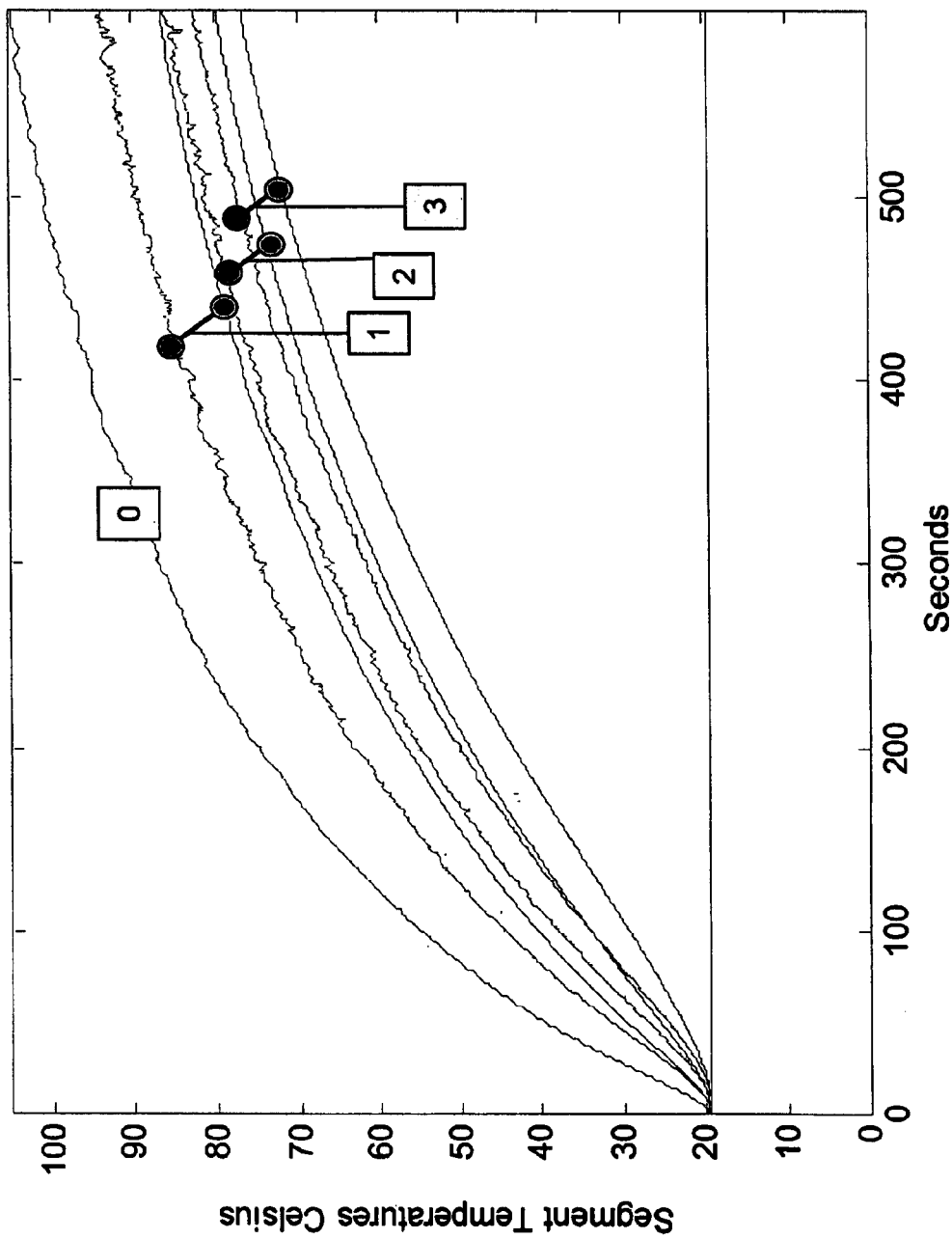
FIG. 12 illustrates effect of parameter mismatch (e.g., thermal resistance error) on projection accuracy.

The corresponding error plot is shown in FIG. 11. A key aspect of this experiment is that, if the driving point (Tin) temperature is known, and the model parameters chosen to closely reflect reality, a simple forward projection can yield the temperature with a worst case accuracy of 6% in this case study. As shown in FIG. 11, temperature 3 is shown having a steady error of about 2%.

In a microprocessor environment, if the orthogonal spreading is to be studied, then a different scenario should be considered.

Figure 13:
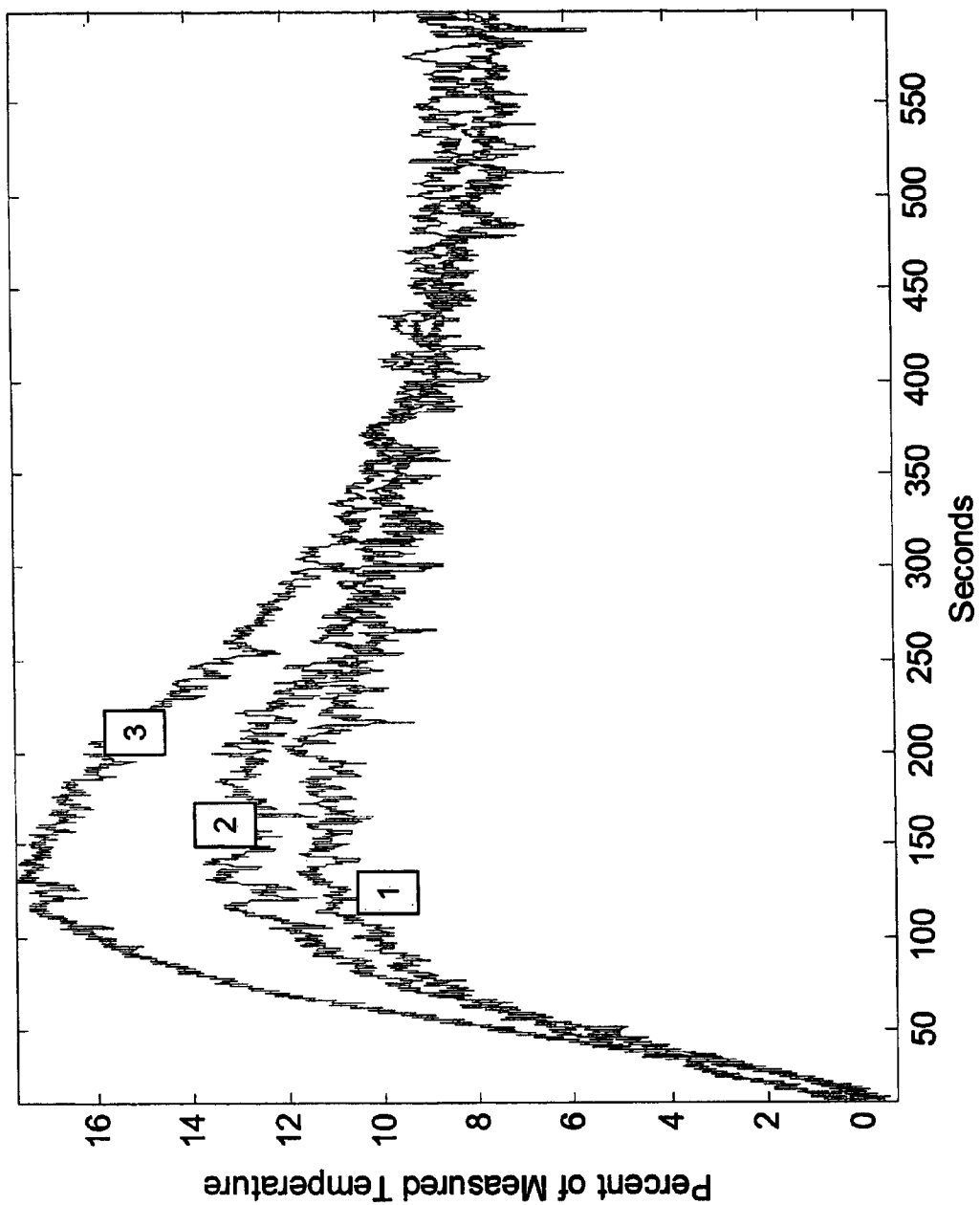
FIG. 13 illustrates relative error in projecting temperature due to error in thermal resistance.

The TIM material's (140, 240, 340) properties such as thermal conductivity are not well-defined, and are subject to variation. If it is assumed that R12 corresponds to the thermal resistance of TIM which is perturbed by 25%, then the simple projection using Equation 5 yields the characteristics shown in FIG. 12. The corresponding error plot is shown in FIG. 13. In some cases, the errors may be as higher than 16% as shown.

Thus, the challenge is how one would remedy the effect of parameter changes during the operating life cycles of a thermal system.

More importantly, with a limited number of temperature measurements on the chip, a method to construct missing temperature components corresponding to other locations on a chip is desirable. The invention provides such a methodology. Specifically, to address this challenge, the present invention leverages a state variable estimator technique, as discussed below and turning to FIG. 14. Hereinbelow is described how the problems are overcome and how the measurements by the sensors are utilized.

Computing "Missing" Temperature Sequence Using Estimator Method:

The theoretical framework to design estimators is well established. A novel use of this method to reconstruct missing temperature measurements as well as to reduce sensitivity of the state estimates to parameter variation are important attributes of the present invention.

Figure 14:
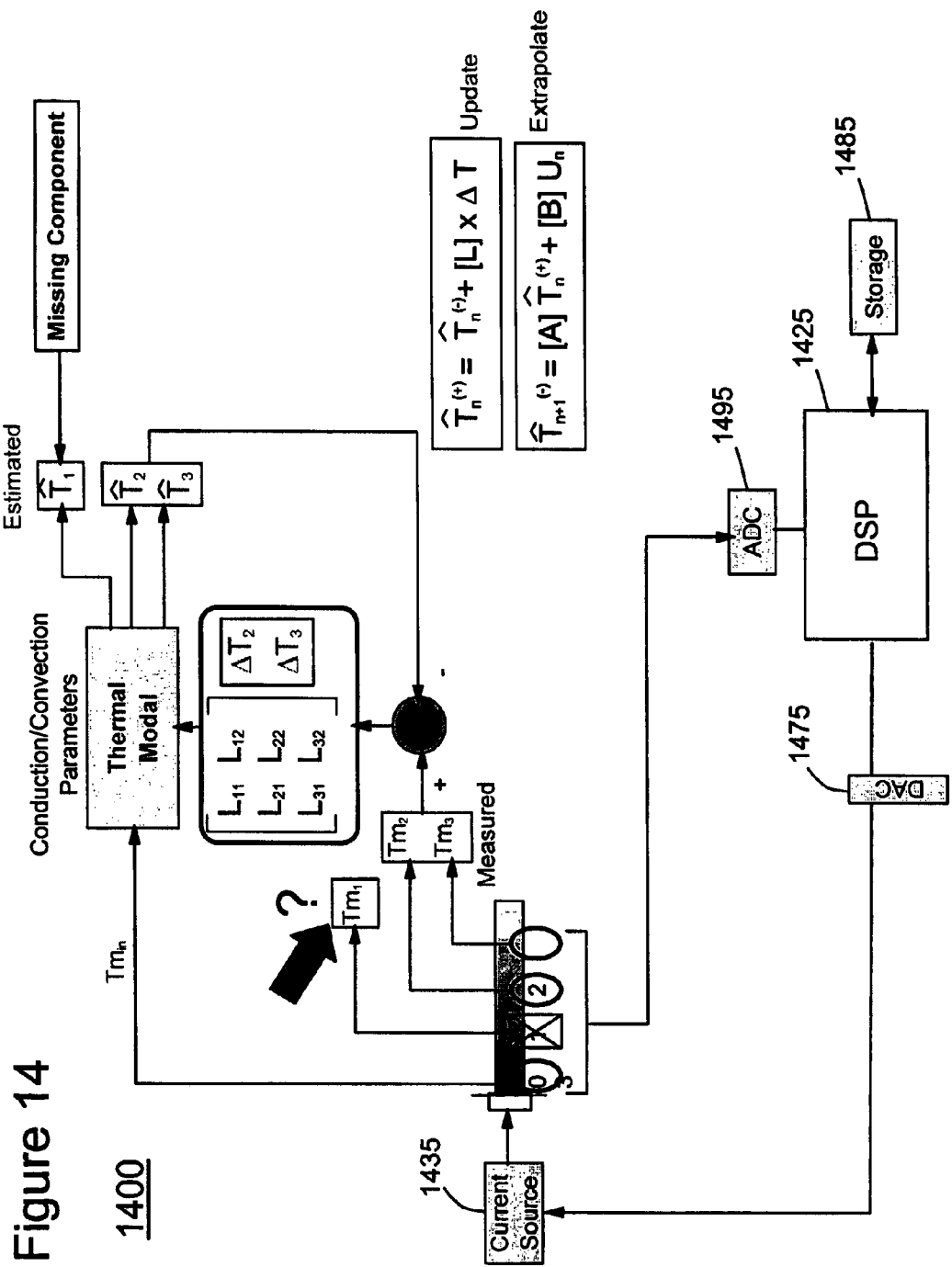
FIG. 14 illustrates an estimation methodology/structure 1400 for constructing "missing" temperature components.

FIG. 14 illustrates the operation of the transient temperature estimator. The estimators provide a mathematically rigorous framework to estimate the state of a dynamic system using a sequence of observations (i.e., measurements). The measurements are linked to the internal state of the system. Equation 6 represents the relationship between measurement and the state/input vectors. Since observations are used to update the state estimates along a statistically optimal path, the method is less sensitive to model parameter variation.

FIG. 14 shows the estimation algorithm where the estimated components are denoted by (^) sign. For simplicity, this notation is dropped in the following discussion. FIG. 14 illustrates the inventive model/algorithm 1400 including DSP 1425, current source 1435, DAC 1475, storage 1485, and ADC 1495.

The estimator performs several fundamental computations. A first one is identical to the simple model discussed (e.g., discussed in conjunction with FIG. 8) in which, given the most recent state $Tn-1^{(+)}$ and control input $Un-1$ and measurement $Tmn-1$, the expected state $Tn^{(-)}$, corresponding to the present measurement instant (n), is extrapolated using Eq. (7).

A second operation involves updating the state $Tn^{(-)}$ using the weighted error between the expected value of the measurement and the actual value of the measurement at instant n. Matrix [L] provides the weighting of the measurement error, DT n.

Projected from previous known state $Tn-1^{(+)}$ and drive input $Un-1$ $$Tn^{(-)}=[A]\times Tn-1^{(+)}+[B]\times Un-1 \qquad (7)$$

State update using measurement error is:

$$Tn^{(+)}=Tn^{(-)}+[L]\times DT n \qquad (8)$$

where $$DT n=(Tmn-\{[C]\times Tn^{(-)}+[D]\times Un\}) \qquad (9)$$

The derivation of mathematical relationships (from Eq. (7) through (9)) can be found in elsewhere.

Using the 1D case (e.g., see FIG. 4), a method to reconstruct a "missing" state, for example T1, is discussed. State components T2 and T3 are assumed to be available for estimation purposes from direct measurement. For a step and for a random input of current, the state vector is extrapolated and updated at a rate of 10 samples/s.

Thus, FIG. 14 shows updating and extrapolation operations of the invention. In the example, the temperature 0 is known as is T2 and T3. However, T1 is not known. With the invention, T1 can be accurately found.

Figure 15:
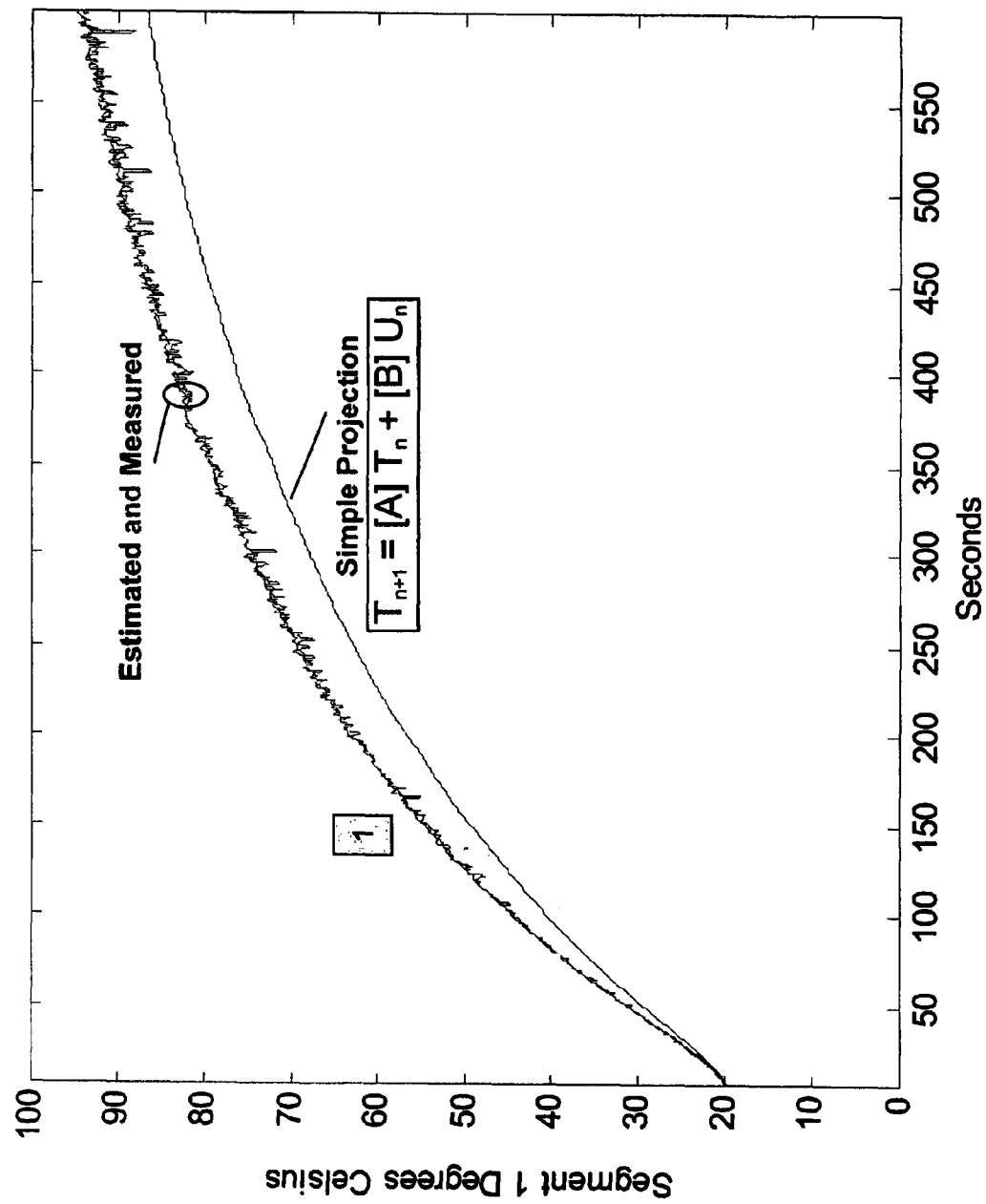
FIG. 15 illustrates construction of "missing" temperature for other temperature measurements.

FIGS. 15 and 16A-16B show the positive effect of using an estimator to reconstruct the missing state element T1.

That is, FIG. 15 shows the estimation of a missing measurement with (1/R12) off by 50% in which T1 is not known, but T2 and T3 are known. This is the simple projection model and the drift is shown.

FIG. 16A shows an estimation error comparison between the simple projection 610 and that 620 using the estimator and specifically using values T2 and T3 to project temperature value T1. In this example, there is an 8 or 9% reduction in error using the invention (estimator) over the simple projection method. FIG. 16B shows the estimation error of the missing measurement with (1/R12) off by 50% in which T2 and T3 are measured.

Hence, with a reduced number of temperature sensors, a multitude of missing temperature values can be constructed in real time. In situations in which one thermal sensor is found to be faulty or noisy, the estimator can be reconfigured to avoid using the faulty measurement.

In summary, by utilizing the general art of estimation theory in a commercial application with a reduced (e.g., economical) set of temperature sensors, an intelligent guess about unknown temperature values at multiple locations can be made.

Multidimensional Model of a Microprocessor Thermal System:

The method presented using a 1-D example can also be enlarged to a microprocessor system.

Figure 17A:
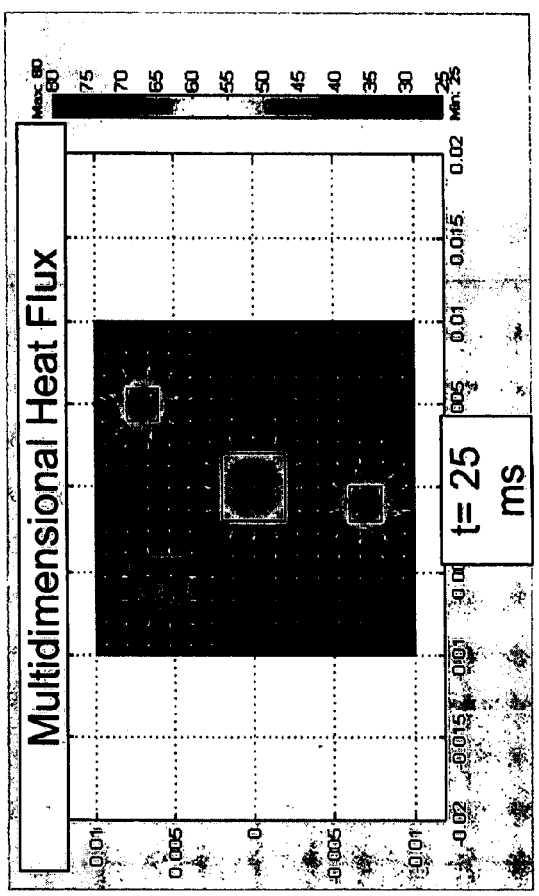
FIGS. 17A-17C illustrate temperature distribution in two dimensions due to transient heating.

FIG. 17A shows a simulated 2-D system having four logic blocks therein, in which the heat can spread in-plane only. For demonstration purposes, the heat flux is generated within the four designated zones on a silicon material of size (20×20 mm). The heat flux time history would resemble that of a sine wave superposed on a ramp.

Figure 17C:
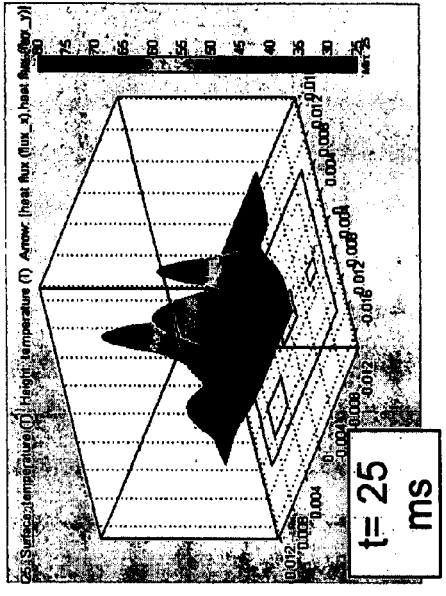
Figure 17B:
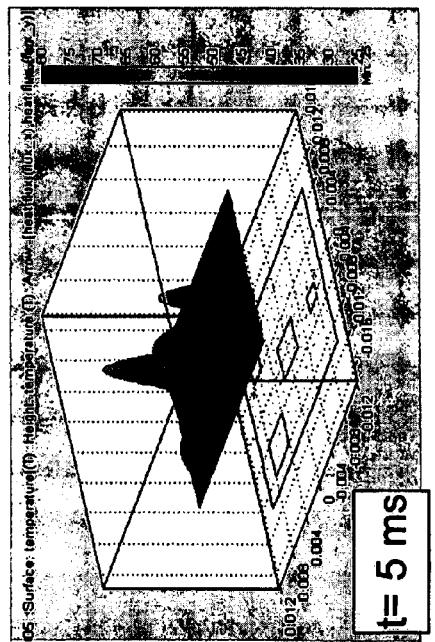

FIG. 17B shows the temperature distribution after 5 ms, where FIG. 17C shows that after 25 ms the temperature reaches near 80 deg. C. It is apparent from the 3-D plot of FIG. 17C that the temperature distribution is not uniform and the peak temperature could shift from location to location as time progresses (not shown).

Thus, as shown in FIGS. 17A-17C, at any given time there may be a different thermal map for a chip. A task is to get closer to FIGS. 17B and 17C, for example, as a function of time, using a much simpler model. Thus, hereinbelow is described how to expand the invention demonstrated in a single dimension (e.g., a copper cylinder described above) to a 2-D (X, Y) chip.

FIG. 18A illustrates a model 1800 for multidimensional flow of heat flux, including silicon 1810, TIM 1840 and heat sink 1830. That is, in FIG. 18A, the in-plane spreading and orthogonal spreading briefly described in FIG. 2 are elaborated in a perspective view.

Similar to arguments developed in Eq.(1) through (5), a state variable formulation can be constructed to link the thermal state of the multidimensional system. The vertical spreading of heat flux is modeled similar to a 1D system driven by the node Tij.

Depending on the thickness of the layers of the different materials involved, additional states along the Z-axis can be introduced. For example, if the temperature sensors (not shown in FIG. 18A) are located at the surface of a heat sink 1830 facing the TIM 1840, this location can be designated by an extra state, Tij-L1 where L1 stands for layer 1. Obviously, inclusion of additional state elements increases the computational load non-linearly, and it is best to maintain the introduction of unwarranted state elements to a minimum.

The transposition of state vector, T, corresponding to the lumped model of FIG. 18A would resemble:

$$\text{Transpose } T = [T_{11}\ T_{11-L1}\ \text{---}\ T_{ij}\ T_{ij-L1}\ \text{---}\ T_{nn}\ T_{nn-L1}] \quad (10)$$

For an X-Y plane divided into (n×n) zones, and a single temperature measurement layer-1, the temperature vector will have $2(n^2)$ elements.

The corresponding energy flow between neighboring elements is defined in FIG. 18B. It is noted that the orthogonal spreading can have several flows (e.g., first, one towards a heat sink and another towards the circuit board that supports the chip). A conventional cooling system at most incurs about 20% heat transfer from the circuit board side.

Experimental Validation of an Equivalent Processor Model:

Similar to the 1D example, it is important to demonstrate the performance of a multidimensional heat transfer problem representing a silicon structure. In order to build a flexible prototype, a silicon wafer 1905 (e.g., exemplarily having a dimensions of 27×27 mm) is designed to have distributed heating elements 1915 and sensors 1960 as shown in the structure 1900 of FIG. 19A. The darkened areas of FIG. 19A represent the heater elements 1915 as shown. FIG. 19B illustrates a copper trace area 1951 of the heater elements which may be 1 µm thick. Other exemplary dimension are also shown.

By driving the heater elements through a DSP (not shown), the desired heat flux is imparted to the prototype silicon 1905.

Thus, turning to FIG. 20, a flowchart of the inventive method 2000 (and system) is shown which provides a real-time executable algorithm. The steps of the method may include the following steps.

In step 2005, first the silicon chip surface is demarcated into finite and contiguous zones (e.g., a zone of separation which may include polygonal, square, or rectangular shapes; preferably a rectangular shape is used for computational simplicity and is assumed below) in an X-Y plane.

Then in step 2010, a reduced order estimator model is developed for dynamic heat transfer from chip surface to ambient.

In step 2015, temperature sensors are deployed and missing temperature components are estimated. The sensors may be gainfully deployed on or away from the processor surface.

In step 2020, the model parameters and temperature prediction capability may be routinely (periodically) evaluated and upgraded. Thus, the invention allows upgrading over the life cycle of the chip and as the chip ages (e.g., the thermal paste degrades, the gap between the heat sink and the silicon chip increases, etc.). This step serves a calibration purpose. This step may be optional and may, but need not be, performed every time the process is performed.

In step 2025, actual current into various zones (e.g., i, j) is measured to enhance estimation accuracy.

In step 2030, the instruction cache is mapped into a sequence of X-Y distributed "quanta of heat packets", and in step 2035, future chip temperature is predicted assuming the execution of cache content in step 2030. Thus, the instruction set is mapped to a temperature (e.g., an energy release) on the silicon wafer or the like.

In step 2040, using power history, prediction lead time is either increased or algorithm complexity is reduced. It is noted that "power history" refers to a power history for a particular machine/processor in a particular use environment (e.g., an airline reservation system etc. will have a certain type of power history). Thus, each processor can build a power history knowledge which will allow it to predict better in each usage application.

In step 2045 a "representative" peak temperature map is computed from average computed temperature. That is, not only will each zone have an average temperature, but there will also be some nonuniform temperature (peak) within the zone. Thus, the average is computed for each zone along with the representative peak temperature. It is noted that the actual peak need not be found, but a representative peak found through statistical methods or the like. Preferably, the zone is not too arbitrarily small to avoid computationally intensive requirements. That is, the smaller the zone (i, j), the more computations which must be performed, which is not desirable.

In step 2050, a composite temperature is presented to the dynamic thermal management (DTM) module. Thus, there is a DTM structure somewhere which is looking for the temperature distribution information. The inventive algorithm presents this information to the DTM. Hence, the decision-making operations by the DTM can be decoupled from the temperature estimation methods of the technique of the present invention.

In step 2055, it is determined whether the processor is in the idle mode. If the processor is in the idle mode (e.g., a "YES), then the process waits (e.g., goes to "WAIT" mode) until the processor becomes active again and the process loops to "START".

If the processor is not idle (e.g., a "NO"), then the process loops back to step 2025, and steps 2025 to 2045 may be repeated in real time at a commensurate sampling rate.

By "commensurate" is meant a sampling rate consistent with one another (e.g., it could be a microsecond speed sampling rate, a millisecond speed sampling rate, etc.), so as to preserve the reliability of the integrity of the chip (e.g., could be a moderate, average temperature for a fraction of a millisecond versus a high peak for a fraction of a microsecond). Indeed, it is difficult to determine at times whether a high spike of temperature is worse than a lower average temperature load imparted to the chip due to different phenomena such as electromigration, etc.

Mapping of Instruction Cache into Future Heat Flux:

In another aspect of the present invention and as briefly alluded to above, it is noted that a unique feature of a memory-based computing device is that the instruction set that is about to be executed is known ahead of time. In more sophisticated processors, the cache contains conditional branches that can occur, although the branches can be projected only with a finite probability. Regardless, the instruction sequence for each possible path is explicitly known.

As discussed above, execution of each instruction releases a "quanta of energy" distributed over the chip surface. If the distribution of energy values for each instruction type is "encoded" into the instruction set, then it is logically feasible to project the amount of thermal energy that will be released once the sequence is executed. In other words, a mechanism to project the energy to be released for the next "ms" of time interval can be computed.

Let the corresponding projected power at sampling time "n" be denoted by $U_{projected}$. Observe that at time "n" the measured Un has already become available and has been used to improve the present state estimate. One could, however, consider improving the projected estimate $U_{Projected}$ from a recent correlation with Un and derive a most-likely value for $U_{Projected}$ before the next sample arrives.

Look-Ahead (Prediction) of Temperature:

With the knowledge of $U_{Projected}$, the temperature of the thermal system can be predicted using the following relationship:

$$Tn+1^{(-)}=[A]\times Tn^{(+)}+[B]\times U_{Projected} \tag{11}$$

The prediction equation (11) assumes that the look-ahead prediction is performed one sampling instant ahead. In case the $U_{Projected}$ is known for multiple sampling intervals, Eq. (11) can be repeatedly applied to predict the temperature multiple samples into the future.

In another case, if the cache content is known only for a fraction of sampling time ahead of current measured temperature, the matrices [A] and [B] of Eq. (11) must be adjusted accordingly (and made available to the module that implements Eq. (11) in the real world).

It is noted that Eq. (4) of a continuous time system is utilized to derive matrices [A] and [B] assuming a full sampling interval. For example, if the instruction cache contains 1 mega-instructions that are being executed at a rate of 2 giga instructions per second, then it will take only 0.5 ms to execute the cache content.

However, if the nominal discrete time representation (Eq. (5)) assumes a sampling time of 0.75 ms, then use of eq. (11) as is will give an erroneous prediction. Corresponding discrete time matrices [A] and [B] must be computed for 0.5 ms sampling time. This is a fine observation that may not produce significant change in the prediction value. However, it may become important for accurate temperature control.

The detailed implementation mechanism of the "cache-to-$U_{Projected}$" is an invention unto itself. Depending on processor architecture (CISC vs. RISC) and the level of sophistication in branch prediction, the projection accuracy can be managed.

Correlating Estimated Temperature to "Hotspot" Temperature

The methodology to estimate and predict temperature distribution has been established through the present invention. The challenge of correlating the estimated temperature, $Tn^{(+)}$, of a zone by a single temperature value corresponding to the "microscopic" peak temperature, $Tn_{-peak}$ still remains to be solved. The microscopic temperature and the average temperature can be probabilistically related through a series of detailed off-line simulations. A relationship where $$Tn_{-peak}=[f(i,j)]Tn^{(+)} \tag{12}$$

A mostly diagonal matrix (2n×2n) [f(i, j)] is obtained through early correlation studies for a typical cooling configuration. The final decision criteria to test if a region on the microprocessor is about to be breached is then made based on $Tn_{-peak}$. It is evident that, as the dimensions of the rectangular zone approaches sub-millimeter scale, the "microscopic" and average temperature would converge to the same value. In this case, the matrix [f(i,j)] of eq. (12) becomes an identity matrix.

As described above, with the unique and unobvious aspects of the present invention, a method and system are provided in which the thermal transient dynamics of a system with uncertain parameters and the output of strategically deployed sensors are combined in order to facilitate the computation (e.g., referring to either estimation or prediction) of the chips maximum temperature. The method corrects for spatial offset and time delay involved in measuring a temperature. Simplification of the method is further achieved by trading off flexibility and accuracy of the computed values of the temperature.

Additionally, the predicted temperature distribution over the X-Y plane is exploited to achieve improved management of the temperature on the silicon surface. Both simple dynamic thermal management (DTM) methods or real time feedback control can be utilized by the invention.

Depending on the specifics of processor/cooling system, alternative methods are shown where a simpler projection algorithm, or an array of sensors with a unique interpolation scheme, is used to construct the temperature distribution.

Additionally, the present invention can estimate/predict power based on the instruction stream (e.g., cache instruction stream) and it can be estimated how much power will be input into the chip to process such instructions (e.g., a 1 Mb instruction stream causes a predetermined amount of current, etc.). This would allow a designer to probe the instruction stream a priori, and the temperature (current) to be "dumped" into the chip can be predicted before it occurs. This would allow "reshuffling" the instructions of the program if it is determined that there would be violation of some established power characteristics criteria, etc.

Thus, with the invention, for example, the computational sequence could be managed such that one set of instructions could be selectively executed in favor of another, thereby to redistribute the power needs by changing the order of executing the instructions or the like.

Additionally, in a different application of the present invention, there is the ability to channel (e.g., move) the cooling capability to the chip area which needs it most (e.g., a "hot spot"). That is, the cooling could be moved to the "hot spot" based on the prediction made (e.g., based on the upcoming instruction(s) to be processed). Hence, even if the cooling capability is fixed, there is the ability to redistribute it (move it) around based on the prediction of the present invention and knowing the temperature map. As such, the invention provides a preemptive control.

While the invention has been described in terms of several exemplary embodiments, those skilled in the art will recognize that the invention can be practiced with modification within the spirit and scope of the appended claims.

For example, even though the method (and system) exemplarily discussed herein is tuned for an application in the thermal management of a microprocessor, it should be understood that any chemical process industry or manufacturing industry that depends on a critical temperature that is not directly measurable can take advantage of the inventive method.

Additionally, as would be evident to one of ordinary skill in the art taking the present application as whole, the invention can be advantageously applied to the entire processor or selectively to a circuit thereof (e.g., the floating point unit etc.).

Further, it is noted that, Applicant's intent is to encompass equivalents of all claim elements, even if amended later during prosecution.

What is claimed is:

1. A method of predicting future temperature, comprising:
    determining a temperature at a location on a semiconductor chip;
    embedding information into instructions stored in an instruction cache;
    computing future power to be dissipated in executing the instructions in said instruction cache based on the embedded information; and
    predicting a future temperature at the location on the semiconductor chip based on the determined temperature and the computed future power.

2. The method of claim 1, wherein said determining said temperature comprises:
    measuring a temperature on the semiconductor chip; and
    interpolating measured temperature to extract maximum temperature.

3. The method of claim 1, further comprising:
    shifting a cooling capability based on said future power computed.

4. The method of claim 1, wherein said determining said temperature comprises:
    demarcating a surface of the chip into finite and contiguous zones;
    developing a reduced order estimator model for dynamic heat transfer from the chip surface to ambient; and
    deploying temperature sensors on or near the chip and estimating missing temperature components.

5. The method of claim 1, wherein said computing said future power comprises mapping the instruction cache into a sequence of X-Y distributed quanta of heat packets.

6. A method of predicting a temperature on semiconductor chip, comprising:
    determining a temperature at a location on a surface of a semiconductor chip at a sampling time, n;
    projecting an amount of energy to be released at the sampling time, n, by executing a plurality of instructions stored in an instruction cache in microprocessor formed on the surface of the semiconductor chip based on information embedded in the plurality of instructions; and
    predicting a temperature at the location on the surface of the semiconductor chip at a next time instant, n+1, based on the determined temperature and the projected amount of energy to be released.

7. The method of claim 6, wherein said determining said temperature comprises developing a global temperature distribution map for the surface of the semiconductor chip at the sampling time, n.

8. The method of claim 7, wherein said developing said global temperature distribution map comprises measuring a temperature at first locations on a semiconductor chip and estimating a temperature at second locations on the semiconductor chip.

9. The method of claim 6, wherein said cache stores a plurality of instructions, and execution of an instruction in the plurality of instructions by a microprocessor on the semiconductor chip releases a quanta of energy over a surface of the chip.

10. The method of claim 9, wherein the embedded information in an instruction of the plurality of instructions represents a quanta of energy distributed over a surface of the chip by an execution of the instruction by the microprocessor.

* * * * *